(12) United States Patent
Dowling

(10) Patent No.: US 8,103,745 B2
(45) Date of Patent: *Jan. 24, 2012

(54) NEGOTIATED WIRELESS PERIPHERAL SECURITY SYSTEMS

(75) Inventor: Eric M. Dowling, Escazu (CR)

(73) Assignee: RPX Corporation, San Francisco, CA (US)

(*) Notice: Subject to any disclaimer, the term of this patent is extended or adjusted under 35 U.S.C. 154(b) by 1131 days.

This patent is subject to a terminal disclaimer.

(21) Appl. No.: 11/806,696

(22) Filed: Jun. 4, 2007

(65) Prior Publication Data

US 2008/0090613 A1   Apr. 17, 2008

Related U.S. Application Data

(63) Continuation of application No. 11/714,798, filed on Mar. 7, 2007, now Pat. No. 7,293,061.

(51) Int. Cl.
G06F 15/16 (2006.01)
(52) U.S. Cl. ......... 709/219; 709/203; 709/227; 709/231
(58) Field of Classification Search .......... 709/202–203, 709/217–219, 227–229, 231; 455/412–420
See application file for complete search history.

(56) References Cited

U.S. PATENT DOCUMENTS

| 4,325,146 | A | 4/1982 | Lennington |
| 4,977,501 | A | 12/1990 | Lefevre |
| 5,081,707 | A | 1/1992 | Schorman et al. |
| 5,126,941 | A | 6/1992 | Gurmu et al. |
| 5,155,688 | A | 10/1992 | Tanaka et al. |
| 5,155,689 | A | 10/1992 | Wortham |
| 5,223,844 | A | 6/1993 | Mansell et al. |
| 5,313,582 | A | 5/1994 | Hendel et al. |
| 5,351,052 | A | 9/1994 | D'Hont et al. |
| 5,353,331 | A | 10/1994 | Emery et al. |
| 5,365,451 | A | 11/1994 | Wang |
| 5,392,390 | A | 2/1995 | Crozier |
| 5,406,491 | A | 4/1995 | Lima |
| 5,416,473 | A | 5/1995 | Dulaney |
| 5,416,842 | A | 5/1995 | Aziz |

(Continued)

FOREIGN PATENT DOCUMENTS

EP    1017197    5/2000

OTHER PUBLICATIONS

Jing et al., "Client-Server Computing in Mobile Environments", ACM Computing Surveys (CSUR), vol. 31, Issue 2, Jun. 1999, 41 pages.

(Continued)

Primary Examiner — Bharat Barot

(57) ABSTRACT

Methods, apparatus, and business techniques are disclosed for use in mobile network communication systems. A mobile unit such as a smart phone is preferably equipped with a wireless local area network connection and a wireless wide area network connection. The local area network connection is used to establish a position-dependent ecommerce network connection with a wireless peripheral supplied by a vendor. The mobile unit is then temporarily augmented with the added peripheral services supplied by the negotiated wireless peripheral. Systems and methods allow the mobile unit to communicate securely with a remote server, even when the negotiated wireless peripheral is not fully trusted. Also mobile units, wireless user peripherals, and negotiated wireless peripherals that project a non-area constrained user interface image on a display surface are taught.

22 Claims, 6 Drawing Sheets

U.S. PATENT DOCUMENTS

| | | |
|---|---|---|
| 5,424,727 A | 6/1995 | Shieh |
| 5,436,960 A | 7/1995 | Campana |
| 5,470,233 A | 11/1995 | Fruchterman et al. |
| 5,477,215 A | 12/1995 | Mandelbaum |
| 5,479,472 A | 12/1995 | Campana et al. |
| 5,487,100 A | 1/1996 | Kane |
| 5,541,583 A | 7/1996 | Mandelbaum |
| 5,543,789 A | 8/1996 | Behr et al. |
| 5,561,704 A | 10/1996 | Salimando |
| 5,565,874 A | 10/1996 | Rode et al. |
| 5,570,417 A | 10/1996 | Byers |
| 5,572,528 A | 11/1996 | Shuen et al. |
| 5,603,054 A | 2/1997 | Theimer et al. |
| 5,608,786 A | 3/1997 | Gordon |
| 5,627,549 A | 5/1997 | Park et al. |
| 5,648,768 A | 7/1997 | Bouve |
| 5,675,507 A | 10/1997 | Bobo |
| 5,682,525 A | 10/1997 | Bouve et al. |
| 5,684,859 A | 11/1997 | Chanroo et al. |
| 5,689,825 A | 11/1997 | Averbuch et al. |
| 5,710,702 A | 1/1998 | Hayashi et al. |
| 5,712,899 A | 1/1998 | Pace, II |
| 5,717,392 A | 2/1998 | Eldridge |
| 5,732,074 A | 3/1998 | Spaur et al. |
| 5,744,787 A | 4/1998 | Teicher |
| 5,745,695 A | 4/1998 | Gilchrist et al. |
| 5,751,227 A | 5/1998 | Yoshida et al. |
| 5,754,786 A | 5/1998 | Diaz et al. |
| 5,767,795 A | 6/1998 | Schaphorst |
| 5,771,353 A | 6/1998 | Eggleston et al. |
| 5,790,642 A | 8/1998 | Taylor et al. |
| 5,796,728 A | 8/1998 | Rondeau et al. |
| 5,799,318 A | 8/1998 | Cardinal et al. |
| 5,802,492 A | 9/1998 | DeLorme et al. |
| 5,809,415 A | 9/1998 | Rossmann |
| 5,819,046 A | 10/1998 | Johnson |
| 5,819,284 A | 10/1998 | Farber et al. |
| 5,838,682 A | 11/1998 | Dekelbaum |
| 5,839,088 A | 11/1998 | Hancock et al. |
| 5,848,373 A | 12/1998 | DeLorme et al. |
| 5,850,618 A | 12/1998 | Suetsugu et al. |
| 5,862,339 A | 1/1999 | Bonnaure et al. |
| 5,864,764 A | 1/1999 | Thro et al. |
| 5,864,823 A | 1/1999 | Levitan |
| 5,867,110 A | 2/1999 | Naito et al. |
| 5,870,741 A | 2/1999 | Kawabe et al. |
| 5,884,033 A | 3/1999 | Duvall |
| 5,887,254 A | 3/1999 | Halonen |
| 5,889,845 A | 3/1999 | Staples |
| 5,898,680 A | 4/1999 | Johnstone et al. |
| 5,900,825 A | 5/1999 | Pressel et al. |
| 5,905,865 A | 5/1999 | Palmer |
| 5,930,474 A | 7/1999 | Dunworth et al. |
| 5,938,721 A | 8/1999 | Dussell et al. |
| 5,941,946 A | 8/1999 | Baldwin |
| 5,949,776 A | 9/1999 | Mahany et al. |
| 5,959,577 A | 9/1999 | Fan et al. |
| 5,961,590 A | 10/1999 | Mendez et al. |
| 5,982,325 A | 11/1999 | Thornton et al. |
| 5,987,062 A | 11/1999 | Engwer et al. |
| 6,005,926 A | 12/1999 | Mashinsky |
| 6,009,355 A | 12/1999 | Obradovich et al. |
| 6,014,090 A | 1/2000 | Rosen et al. |
| 6,023,708 A | 2/2000 | Mendez et al. |
| 6,028,537 A | 2/2000 | Suman et al. |
| 6,029,141 A | 2/2000 | Bezos et al. |
| 6,035,104 A | 3/2000 | Zahariev |
| 6,047,236 A | 4/2000 | Hancock et al. |
| 6,049,711 A | 4/2000 | Ben-Yehezkel et al. |
| 6,052,439 A | 4/2000 | Gerszberg et al. |
| 6,052,600 A | 4/2000 | Fette et al. |
| 6,058,422 A | 5/2000 | Ayanoglu et al. |
| 6,061,565 A | 5/2000 | Innes et al. |
| 6,067,008 A | 5/2000 | Smith |
| 6,072,483 A | 6/2000 | Rosin et al. |
| 6,073,165 A | 6/2000 | Narasimhan et al. |
| 6,076,075 A | 6/2000 | Teicher |
| 6,085,192 A | 7/2000 | Mendez et al. |
| 6,088,594 A | 7/2000 | Kingdon et al. |
| 6,091,956 A | 7/2000 | Hollenberg |
| 6,101,531 A | 8/2000 | Eggleston et al. |
| 6,107,940 A | 8/2000 | Grimm |
| 6,108,533 A | 8/2000 | Brohoff et al. |
| 6,115,754 A | 9/2000 | Landgren |
| 6,122,520 A | 9/2000 | Want et al. |
| 6,127,972 A | 10/2000 | Avidor et al. |
| 6,131,121 A | 10/2000 | Mattaway |
| 6,134,432 A | 10/2000 | Holmes et al. |
| 6,148,261 A | 11/2000 | Obradovich et al. |
| 6,151,606 A | 11/2000 | Mendez et al. |
| 6,154,212 A | 11/2000 | Eick et al. |
| 6,154,461 A | 11/2000 | Sturniolo et al. |
| 6,154,745 A | 11/2000 | Kari et al. |
| 6,170,026 B1 | 1/2001 | Kimura et al. |
| 6,175,589 B1 | 1/2001 | Cummings |
| 6,185,204 B1 | 2/2001 | Voit |
| 6,185,205 B1 | 2/2001 | Sharrit et al. |
| 6,199,045 B1 | 3/2001 | Giniger et al. |
| 6,201,962 B1 | 3/2001 | Sturniolo |
| 6,202,023 B1 | 3/2001 | Hancock et al. |
| 6,205,211 B1 | 3/2001 | Thomas et al. |
| 6,219,694 B1 | 4/2001 | Lazaridis |
| 6,230,012 B1 | 5/2001 | Willkie et al. |
| 6,236,652 B1 | 5/2001 | Preston et al. |
| 6,243,572 B1 | 6/2001 | Chow et al. |
| 6,256,498 B1 | 7/2001 | Ludwig |
| 6,269,402 B1 | 7/2001 | Lin et al. |
| 6,285,858 B1 | 9/2001 | Yoshida |
| 6,289,464 B1 | 9/2001 | Wecker et al. |
| 6,295,482 B1 | 9/2001 | Tognazzini |
| 6,308,281 B1 | 10/2001 | Hall et al. |
| 6,321,090 B1 | 11/2001 | Soliman |
| 6,327,533 B1 | 12/2001 | Chou et al. |
| 6,332,127 B1 | 12/2001 | Bandera et al. |
| 6,334,131 B2 | 12/2001 | Chakrabarti et al. |
| 6,342,844 B1 | 1/2002 | Rozin |
| 6,353,398 B1 | 3/2002 | Amin et al. |
| 6,359,880 B1 | 3/2002 | Curry et al. |
| 6,373,817 B1 | 4/2002 | Kung et al. |
| 6,381,603 B1 | 4/2002 | Chan et al. |
| 6,400,941 B1 | 6/2002 | Nara |
| 6,401,085 B1 | 6/2002 | Gershman et al. |
| 6,408,307 B1 | 6/2002 | Semple et al. |
| 6,411,679 B1 | 6/2002 | Khasnabish |
| 6,415,271 B1 | 7/2002 | Turk et al. |
| 6,415,291 B2 | 7/2002 | Bouve et al. |
| 6,421,707 B1 | 7/2002 | Miller et al. |
| 6,442,248 B1 | 8/2002 | Davis |
| 6,442,598 B1 | 8/2002 | Wright et al. |
| 6,446,076 B1 | 9/2002 | Burkey et al. |
| 6,452,910 B1 | 9/2002 | Vij et al. |
| 6,452,915 B1 | 9/2002 | Jorgensen |
| 6,456,603 B1 | 9/2002 | Ismailov et al. |
| 6,470,179 B1 | 10/2002 | Chow et al. |
| 6,470,447 B1 | 10/2002 | Lambert et al. |
| 6,473,102 B1 | 10/2002 | Rodden et al. |
| 6,487,406 B1 | 11/2002 | Chang et al. |
| 6,490,443 B1 | 12/2002 | Freeny, Jr. |
| 6,497,371 B2 | 12/2002 | Kayanakis |
| 6,515,985 B2 | 2/2003 | Shmulevich et al. |
| 6,515,997 B1 | 2/2003 | Feltner et al. |
| 6,522,875 B1 | 2/2003 | Dowling et al. |
| 6,529,596 B1 | 3/2003 | Asprey et al. |
| 6,535,493 B1 | 3/2003 | Lee et al. |
| 6,546,261 B1 | 4/2003 | Cummings |
| 6,546,425 B1 | 4/2003 | Hanson et al. |
| 6,549,612 B2 | 4/2003 | Gifford |
| 6,549,625 B1 | 4/2003 | Rautila et al. |
| 6,553,240 B1 | 4/2003 | Dervarics |
| 6,556,586 B1 | 4/2003 | Sipila |
| 6,563,919 B1 | 5/2003 | Aravamudhan et al. |
| 6,571,055 B1 | 5/2003 | Sawabe et al. |
| 6,571,095 B1 | 5/2003 | Koodli |
| 6,571,290 B2 | 5/2003 | Selgas |
| 6,574,239 B1 | 6/2003 | Dowling et al. |
| 6,577,229 B1 | 6/2003 | Bonneau et al. |
| 6,580,700 B1 | 6/2003 | Pinnard et al. |

| | | | |
|---|---|---|---|
| 6,584,321 B1 | 6/2003 | Coan et al. | |
| 6,594,488 B1 | 7/2003 | Chow et al. | |
| 6,594,692 B1 | 7/2003 | Reisman et al. | |
| 6,600,734 B1 | 7/2003 | Gernert et al. | |
| 6,622,124 B1 | 9/2003 | Kolls | |
| 6,631,418 B1 | 10/2003 | Watkins | |
| 6,639,550 B2 | 10/2003 | Knockeart | |
| 6,643,684 B1 | 11/2003 | Malkin et al. | |
| 6,650,899 B1 | 11/2003 | Stumpert | |
| 6,654,359 B1 | 11/2003 | La Porta et al. | |
| 6,654,615 B1 | 11/2003 | Chow et al. | |
| 6,654,786 B1 | 11/2003 | Fox et al. | |
| 6,680,923 B1 | 1/2004 | Leon et al. | |
| 6,687,243 B1 | 2/2004 | Sayers et al. | |
| 6,693,886 B1 | 2/2004 | Haikonen et al. | |
| 6,704,303 B1 | 3/2004 | Bowman-Amulah | |
| 6,708,221 B1 | 3/2004 | Mendez et al. | |
| 6,714,536 B1 | 3/2004 | Dowling | |
| 6,714,969 B1 | 3/2004 | Klein et al. | |
| 6,724,833 B1 | 4/2004 | Cummings | |
| 6,744,759 B1 | 6/2004 | Sidhu et al. | |
| 6,757,518 B2 | 6/2004 | Spratt et al. | |
| 6,775,563 B2 | 8/2004 | Younis | |
| 6,776,339 B2 | 8/2004 | Piikivi | |
| 6,778,832 B1 | 8/2004 | Chow et al. | |
| 6,781,623 B1* | 8/2004 | Thomas | 348/208.4 |
| 6,789,102 B2 | 9/2004 | Gotou et al. | |
| 6,804,720 B1 | 10/2004 | Vilander et al. | |
| 6,806,866 B2 | 10/2004 | Benayoun et al. | |
| 6,816,083 B2 | 11/2004 | Brandt | |
| 6,826,405 B2 | 11/2004 | Dovaik et al. | |
| 6,901,429 B2* | 5/2005 | Dowling | 709/203 |
| 6,970,850 B1 | 11/2005 | Freeny, Jr. | |
| 6,985,931 B2 | 1/2006 | Dowling | |
| 7,032,009 B2 | 4/2006 | Dowling | |
| 7,043,225 B1 | 5/2006 | Patel et al. | |
| 7,076,552 B2 | 7/2006 | Mandato | |
| 7,085,260 B2 | 8/2006 | Karaul et al. | |
| 7,110,744 B2 | 9/2006 | Freeny, Jr. | |
| 7,185,360 B1 | 2/2007 | Anton et al. | |
| 7,188,185 B2 | 3/2007 | Dowling | |
| 7,197,569 B2 | 3/2007 | Dowling | |
| 7,209,946 B2 | 4/2007 | Dowling | |
| 7,222,154 B2 | 5/2007 | Dowling | |
| 7,224,962 B1* | 5/2007 | Kite | 455/412.1 |
| 7,228,355 B2 | 6/2007 | Dowling | |
| 7,246,149 B2 | 7/2007 | Dowling | |
| 7,260,638 B2 | 8/2007 | Crosbie | |
| 7,293,061 B2 | 11/2007 | Dowling | |
| 7,293,107 B1 | 11/2007 | Hanson et al. | |
| 7,293,110 B2 | 11/2007 | Dowling | |
| 7,313,825 B2* | 12/2007 | Redlich et al. | 709/229 |
| 7,424,511 B2 | 9/2008 | Dowling | |
| 7,424,512 B2 | 9/2008 | Dowling | |
| 7,509,437 B2 | 3/2009 | Dowling | |
| 7,546,334 B2* | 6/2009 | Redlich et al. | 709/219 |
| 7,856,508 B2 | 12/2010 | Dowling | |
| 2002/0029186 A1 | 3/2002 | Roth et al. | |
| 2002/0052965 A1 | 5/2002 | Dowling | |
| 2002/0069284 A1 | 6/2002 | Slemmer et al. | |
| 2002/0085719 A1 | 7/2002 | Crosbie | |
| 2003/0050019 A1 | 3/2003 | Dowling et al. | |
| 2003/0069029 A1 | 4/2003 | Dowling et al. | |
| 2003/0177255 A1* | 9/2003 | Yun | 709/231 |
| 2004/0062213 A1 | 4/2004 | Koss | |
| 2007/0038750 A1 | 2/2007 | Jorgensen | |
| 2007/0064199 A1* | 3/2007 | Schindler et al. | 353/30 |
| 2008/0155063 A1* | 6/2008 | Liwerant et al. | 709/219 |

OTHER PUBLICATIONS

Sony DCR-TRV30 MiniDV Digital Camcorder / 1.5-Megapixel Still Camera with USB, Jul. 18, 2001, 3 pages.
Preliminary Amendment, filed Mar. 3, 2005 in co-pending U.S. Appl. No. 11/070,893, 19 pages.
Office action mailed Oct. 23, 2008, in co-pending U.S. Appl. No. 11/070,893, 14 pages.
Amendment, filed Jan. 23, 2009 in co-pending U.S. Appl. No. 11/070,893, 33 pages.
Office action mailed Apr. 15, 2009 in co-pending U.S. Appl. No. 11/070,893, 13 pages.
Preliminary Amendment, filed Mar. 31, 2005 in co-pending U.S. Appl. No. 11/094,130, 12 pages.
Office action mailed Feb. 7, 2008 in co-pending U.S. Appl. No. 11/094,130, 10 pages.
Amendment, filed May 27, 2008 in co-pending U.S. Appl. No. 11/094,130, 17 pages.
Notice of Non-compliant Amendment mailed Jun. 27, 2008 in co-pending U.S. Appl. No. 11/094,130, 2 pages.
Amendment, filed Jul. 9, 2008 in co-pending U.S. Appl. No. 11/094,130, 9 pages.
Office action mailed Oct. 30, 2008 in co-pending U.S. Appl. No. 11/094,130, 6 pages.
Amendment, filed Jan. 30, 2009 in co-pending U.S. Appl. No. 11/094,130, 21 pages.
Patent Application, filed Aug. 11, 2008 in co-pending U.S. Appl. No. 12/222,473, 58 pages.
Preliminary Amendment, filed Aug. 11, 2008 in co-pending U.S. Appl. No. 12/222,473, 6 pages.
Preliminary Amendment, filed Jul. 12, 2007 in co-pending U.S. Appl. No. 12/222,473, 8 pages.
Office action, mailed Jun. 12, 2008 in co-pending U.S. Appl. No. 11/826,057, 11 pages.
Amendment, filed Jul. 24, 2008 in co-pending U.S. Appl. No. 11/826,057, 12 pages.
Office action, mailed Oct. 31, 2008 in co-pending U.S. Appl. No. 11/826,057, 11 pages.
Amendment, filed Jan. 29, 2009 in co-pending U.S. Appl. No. 11/826,057, 15 pages.
Notice of Allowance and Examiner's Amendment, mailed Mar. 10, 2008 in co-pending U.S. Appl. No. 11/826,057, 7 pages.
Patent Application, filed Jan. 8, 2009 in co-pending U.S. Appl. No. 12/350,801, 33 pages.
Preliminary Amendment, filed Aug. 11, 2008 in co-pending U.S. Appl. No. 12/350,801, 10 pages.
"JAIN: A new approach to services in communication networks," by John de Keijzer, et al., IEEE Communications Magazine, vol. 38, No. 1, Jan. 2000.
"JAIN protocol API's," by Bhat et al., IEEE Communications Magazine, vol. 38, No. 1, Jan. 2000.
"Java call control, coordination and transactions," by R. Jain et al., IEEE Communications Magazine, vol. 38, No. 1, Jan. 2000.
"Enabling network management using Java technologies," by Jae-oh Lee, IEEE Communications Magazine, vol. 38, No. 1, Jan. 2000.
"Fast and scalable handoffs for wireless internetworks," Proc. $2^{nd}$ ACM annual international conference on mobile computing and networking, Nov. 1996.
"Enabling components for multistandard software radio base stations," wireless personal communications, vol. 13, pp. 145-166, 2000.
"Comments of the national telecommunications and information administration," http://www.ntia.doc.gov.ntiahome/fccfilings/2000/sdrnoi61600.htm.
"JTRS—An open distributed-object computing software radio architecture, gateway to the new millenium," $18^{th}$ Digital Avionics systems conference, Oct. 1999.
"Mobility Management in Next Generation Wireless Systems," Akyidiz et al., Proceedings of the IEEE, vol. 87, No. 8, pp. 1347-1384, Aug. 1999.
"Beyond Software Radio, towards re-configurability across the whole System and across networks," Jorge M. Piereia, IEEE Vehiclular Technology Conference 1999.
"Mode switching and software download for software defined radio: the SDR forum approach," Cummings et al., IEEE Communications Magazine, Aug. 1999.
"Advanced Wireless Terminals," Lettieri et al., IEEE Personal Communcations, Feb. 1999.
Response After Final filed Jun. 15, 2009 in co-pending U.S. Appl. No. 11/070,893, 35 pages.
Notice of Allowance mailed Jun. 22, 2009 in co-pending U.S. Appl. No. 11/070,893, 18 pages.

Final Office action mailed Apr. 30, 2009 in co-pending U.S. Appl. No. 11/094,130, 6 pages.
Amendment After Final filed Jun. 29, 2009 in co-pending Patent Application No. 11/094,130, 27 pages.
Request for Continued Examination and Amendment filed Jun. 9, 2009 in co-pending U.S. Appl. No. 11/826,057, 13 pages.
Issue Fee filed Jul. 14, 2009 in U.S. Appl. No. 11/070,893, 5 pages.
Issue Notification mailed Aug. 5, 2009 in U.S. Appl. No. 11/070,893, 1 page.
Advisory action mailed Sep. 14, 2009 in U.S. Appl. No. 11/094,130, 3 pages.
Request for Continued Examination filed Sep. 30, 2009 in U.S. Appl. No. 11/094,130, 5 pages.
Notice of Allowance mailed Aug. 10, 2009 in Patent Application No. 11/826,057, 7 pages.
Issue Fee filed Aug. 27, 2009 in U.S. Appl. No. 11/826,057, 3 pages.
Office Action mailed Oct. 30, 2009 in co-pending U.S. Appl. No. 11/094,130, 6 pages.
Office Action Response mailed Apr. 28, 2010 in co-pending U.S. Appl. No. 11/094,130, 14 pages.
Notice of Allowance mailed Jun. 28, 2010 in co-pending U.S. Appl. No. 11/094,130, 7 pages.
Issue Fee Payment; Interview Summary; and, Comments Regarding Examiner's Statement of Reasons for Allowance mailed Sep. 22, 2010 in co-pending U.S. Appl. No. 11/094,130, 5 pages.
Issue Notification mailed Oct. 6, 2010 in co-pending U.S. Appl. No. 11/094,130, 1 page.
Office Action mailed Feb. 17, 2010 in co-pending U.S. Appl. No. 12/222,473, 9 pages.
Office Action Response mailed Jun. 16, 2010 in co-pending U.S. Appl. No. 12/222,473, 10 pages.
Notice of Non-Compliant Amendment mailed Jun. 28, 2010 in co-pending U.S. Appl. No. 12/222,473, 1 page.
Notice of Non-Compliant Amendment Response mailed Jul. 8, 2010 in co-pending U.S. Appl. No. 12/222,473, 11 pages.
Notice of Allowance mailed Oct. 8, 2010 in co-pending U.S. Appl. No. 12/222,473, 7 pages.
Office Action mailed Jul. 22, 2010 in co-pending U.S. Appl. No. 12/350,801, 9 pages.
Notice of Allowance mailed Jan. 6, 2011 in co-pending U.S. Appl. No. 12/350,801, 7 pages.
Office Action Response mailed Oct. 20, 2010 in co-pending U.S. Appl. No. 12/350,801, 11 pages.
Issue Fee Payment and Comments on Examiner's reasons for allowance mailed Nov. 9, 2010 in co-pending U.S. Appl. No. 12/222,473, 3 pages.
Issue Notification mailed Dec. 1, 2010 in co-pending U.S. Appl. No. 12/222,473, 1 page.

* cited by examiner

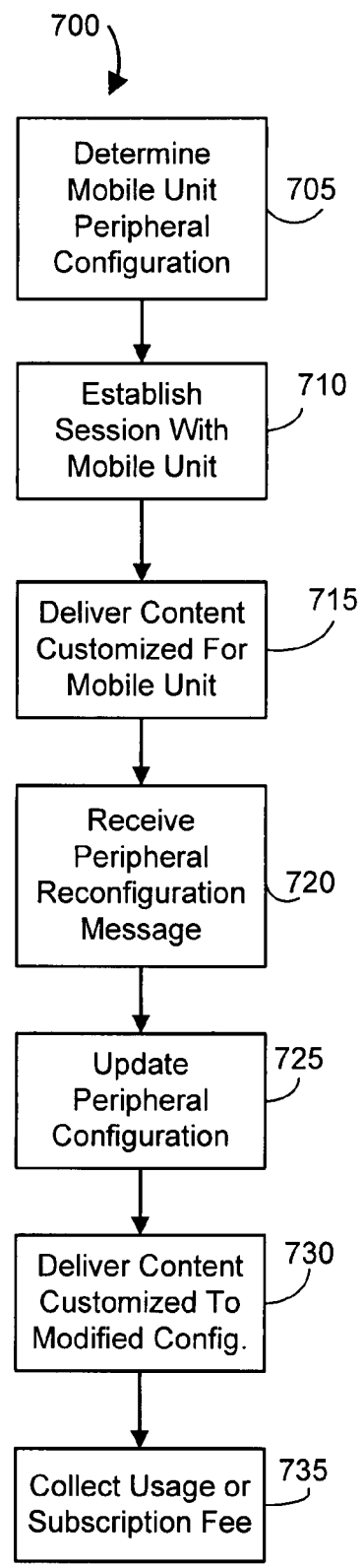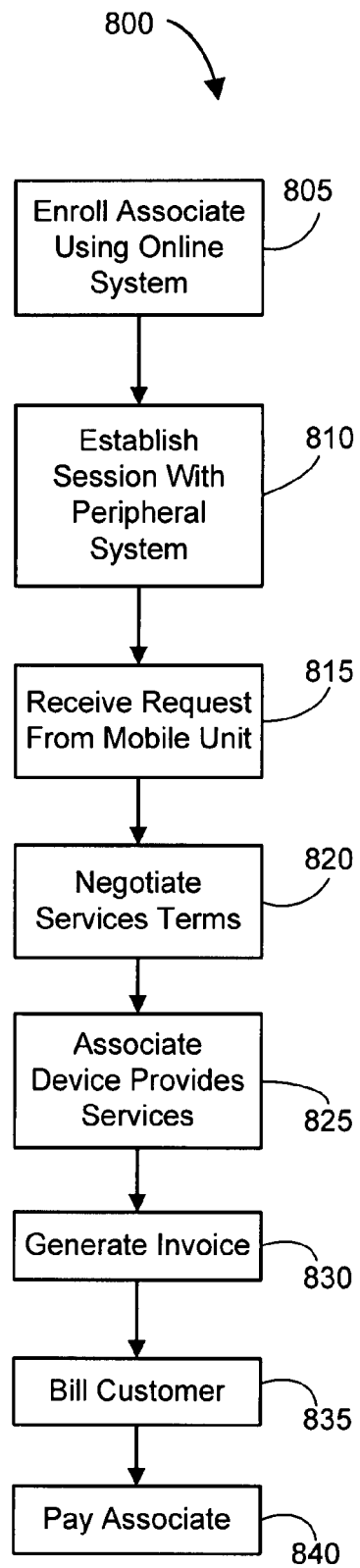
FIG. 7
FIG. 8

NEGOTIATED WIRELESS PERIPHERAL SECURITY SYSTEMS

This application is a of U.S. patent application Ser. No. 11/714,798, filed Mar. 7, 2007, which is a continuation of U.S. patent application Ser. No. 11/043,110, filed Jan. 27, 2005, now U.S. Pat. No. 7,209,946, which is a continuation of U.S. patent application Ser. No. 09/943,214, filed Aug. 30, 2001, now U.S. Pat. No. 6,901,429, which is a continuation-in-part of U.S. patent application Ser. No. 09/698,882, filed Oct. 27, 2000, now U.S. Pat. No. 7,035,932 and U.S. patent application Ser. No. 09/722,981, filed Nov. 27, 2000, abandoned, and U.S. patent application Ser. No. 09/935,116, filed Aug. 22, 2001, now U.S. Pat. No. 6,965,914, all by the same applicant.

BACKGROUND OF THE INVENTION

1. Field of the Invention

This invention relates generally to mobile data network infrastructure methods and systems. More particularly, the invention relates to methods and systems that allow mobile devices to wirelessly contract for products and services that can result in a temporary expansion of mobile unit capabilities.

2. Description of the Related Art

This application is closely related to and is a continuation-in-part of U.S. patent application having attorney docket number EMD-NWP.001, filed Aug. 22, 2001. This application augments the aforementioned application with additional security procedures and includes a substantial amount of overlapping material. The security problem addressed in the current application concerns mainly the trustworthiness of negotiated wireless peripheral devices that are supplied, for example, by information kiosks that supply a wireless local area network to user devices in the immediate vicinity. Such information kiosks according to the present invention also provide peripheral device augmentation services so that a handheld device such as a smart phone with an area-constrained user interface can behave as a desktop system, i.e., a computer with a non-area constrained user interface. In this application, as in the aforementioned application, a non-area-constrained user interface is typically a desktop interface with a keyboard, mouse and a display area that is at least about six inches, but is preferably at least fourteen inches. Some non-area constrained user interfaces may use a speech interface to augment the interface or may use it to replace, for example, the keyboard or pointing device. That is, the present invention can be used with other non-area constrained user interfaces beside traditional PC or workstation style interfaces, so long as the display surface area is not constrained by the design concerns of a hand-held mobile unit.

Wireless networks have been evolving rapidly since the early 1980's when the first generation cellular telephone network was deployed. By this time the third generation network technologies are fairly well defined and initial deployments are beginning. Already, fourth generation systems are in the research phase. A key difference between the first generation systems and modern systems is the move from circuit switched analog technology to packet switched digital technology. While early cellular telephones were wireless versions of standard analog telephones, newer cellular and PCS (personal communication system) phones provide both voice and data channels. It is envisioned that in the future both the voice and data traffic will be carried by a unified packet switched network.

A key attribute of third generation (3G) cellular systems is their ability to handle data traffic. To the user, this means a cellular phone can provide Internet connectivity. A "smart phone" is a device that provides voice connectivity, data connectivity and computerized application programs such as those as offered by PDA (personal digital assistant) technology.

A key problem faced by smart phones is their limited user interface capabilities. Smart phones need to be compact in design. As such, a typical smart phone has a relatively small display surface and a telephone-sized keypad. While a smart phone may be able to provide wireless Internet capabilities, its limited display surface area precludes it from providing a full featured web browser as found on desktop systems. Some prior art systems use speech recognition and voice based operating system techniques to address the user interface size constraints imposed by smart phones. Still, voice based user interfaces are cumbersome in the way they control complex data entry and menu navigation requirements that arise in operating systems and application programs such as spread sheets.

Prior art systems understand the restricted user interface capabilities of smart phones and similar mobile devices. As such, various dialects of XML (eXtensible Markup Language) have been developed to allow content to be customized for interactive display on specific types of smart phones and other mobile devices. A variation of XML known as WML (Wireless Markup Language) includes language constructs (e.g., tag sets) that allow a server to deliver customized content to a mobile device made by a specific manufacturer and having a specific model number. This allows the content to be customized for the specific user interface configuration supplied by the mobile device.

In general, a device-specific user interface that involves a restricted display area and a fixed set of user interface buttons, such as those found on a smart phone or a PDA is called an "area-constrained user interface." A user interface found on a desktop system such as a PC or workstations is called a "non-area-constrained user interface."

Typically, systems with non-area constrained user interfaces involve a desktop user interface. For example, a desktop user interface is found on computer systems such as those running the Windows™ or X-Windows™ operating systems. In general, any graphical user interface that allows a user to make menu selections and/or icon selections in a non-area constrained environment can be thought of as a desktop interface. Typically, desktop interfaces use pointing devices such as mouse devices and also provide optional keyboard support. Some desktop user interfaces also provide speech recognition and voice based prompts.

It should be noted that different models of smart phones and other mobile devices will have different display surface sizes and shapes, and different sets of keys on different types of keypads (area-constrained). This is in contrast to desktop systems that can all be assumed to have a desktop sized monitor, a standard keyboard, and a mouse (non-area constrained). While WML and similar technologies can be used to specify how content should be delivered to a variety of smart phone devices, the display surface area and keypad surface area limitations remain. A smart phone is generally limited in its set of peripherals and therefore is incapable of providing the type of user interface that can be supplied by computer systems with full sized display surfaces, keyboards, and other devices such as pointing devices.

Other problems with existing technology include the unavailability of techniques and protocols to allow smart phones to use a wLAN (wireless local area network) connection or a wWAN (wireless wide area network) connection to contract with local entities to provide products and services. Enhanced systems and methods are lacking to allow a user of a mobile unit such as a smart phone to negotiate with a local wireless device and contract products and services therefrom.

Prior art systems have been developed to allow users to access their home or office applications while away on the road. For example companies like Oracle Inc. supply portal software. Portal software allows users to log into a computer system remotely and gain access to both standard web content interfaces and back office application interfaces. That is, a portal is an application server that provides an interface between remote network users and application programs running in an enterprise environment such as a home or an office. For example, using a portal, a remote worker could log into a portal server and access several application programs such as email programs and spreadsheets that run on a home or office computer. Still, while portal software is useful, in many cases the mobile user is restricted by a limited UI (user interface) such as the one provided by a smart phone. Smart phone UI's do not typically provide a display surface sufficient to support a full-scale desktop UI. This inhibits smart phone users from working with traditional desktop applications. It would be desirable to have an application server or portal that could supply the look and feel of a full home/office desktop system to smart phone users. It would be desirable for smart phone users to be able to use the smart phone to access a full-sized desktop UI. It would also be desirable for smart phone users to be able to use the limited smart phone UI when needed to support mobility.

It would be desirable to have a mobile unit that could provide a compact smart phone UI to a user, but could then be reconfigured to support a full desktop style UI so that the user could work on desktop applications while away from the home or office. For example, it would be desirable for a user of a smart phone who is waiting in an airport or staying in a hotel room to be able to walk up to a peripheral augmentation subsystem that supplies hardware support for a temporarily extended UI. It would be desirable for the smart phone to wirelessly negotiate with the peripheral augmentation subsystem to pay for services rendered using either a per-usage payment schedule or a by-subscription payment schedule. It would also be desirable to have a global desktop server that could be used to allow mobile users to see images of their desktop applications as though they were back at their home office. With the availability of such peripheral augmentation equipment, users could carry smart phones and enjoy all of the capabilities of full desktop systems when needed. It would further be desirable to have business methods to support the use of contracted peripherals and global desktop services. It would also be desirable to also provide a means for a mobile unit to set up position-dependent ecommerce sessions with wireless infrastructure vending devices that sell products and services beside negotiated wireless peripheral services.

In such systems, especially in systems where information kiosks supplying NWP services are supplied by less-known entities such as small business owners who provide federated NWP services, security problems may arise. For example, a user may walk up to an NWP system provided in the form of an information kiosk having user-terminal augmentation capabilities. The user then contracts for peripheral extension services with the NWP device. In some cases the WAN connection between the mobile unit and an application server may be rerouted through the NWP. In such cases the NWP may be able to monitor traffic between the mobile unit and the application server. The NWP may also be able to intercept I/O streams such as the information typed by the user and the information displayed on the non-area constrained display surface. As such, security systems, security methods, and business methods are needed to ensure that the user maintains security while contracting with NWP devices for network and/or peripheral augmentation services.

Thus it would be desirable to have security systems, security methods and secure business methods that allow a mobile unit to use the services provided by an NWP device without having to compromise security.

SUMMARY OF THE INVENTION

The present invention solves these and other problems by providing systems and methods to enable a mobile unit to access an expanded set of peripherals. The present invention includes various aspects as outlined herein and in further detail in the detailed description.

A first aspect of the present invention involves a negotiated wireless peripheral (NWP) device. For example, the NWP device may be supplied by an information kiosk located in a public place or along a roadside to communicate with local network entities. A local network entity may involve a smart phone or other types of mobile units that have a short-range wireless air interface such as Bluetooth™, 802.11, or other types of radio links. The NWP device includes a short-range wireless transceiver to support the establishment of a position-dependent ecommerce session with a mobile unit. The NWP device also uses a negotiation module to engage in a handshaking sequence with the mobile unit to establish the position-dependent ecommerce session. The NWP device supplies a WAN gateway module that couples a traffic stream generated in the mobile unit and received via the short-range wireless transceiver to a wireline WAN connection. The mobile unit thereby maintains an end-to-end secure connection though the NWP device with a remote server. The NWP device also supplies a peripheral augmentation system that redirects one or more I/O streams from the mobile unit to a set of peripheral devices that support a non-area constrained user interface to the user of the mobile. The NWP device supplies a protected memory segment for exclusive use by an I/O process that supports the non-area constrained user interface. A process such as an object governs the protected memory segment and ensures that information in the memory is not read by other processes. The object also preferably controls a display window and ensures that other processes are not granted access to information in the window. The object may be implemented as a Java™ applet, for example.

Another aspect of the present invention involves a method for use with a mobile unit that communicates with a negotiated wireless peripheral device. The mobile unit establishes via a wireless local area network air interface a position-dependent ecommerce session with the negotiated wireless peripheral device. The mobile unit also contracts with the negotiated wireless peripheral device for the use of at least one peripheral that supports enhanced user interface capabilities. Next an I/O stream is redirected from a peripheral in the mobile unit to a peripheral supplied by the negotiated wireless peripheral device to support a non-area-constrained user interface. The mobile unit also establishes via a wireless wide area network connection an end-to-end secure client-server session between the mobile unit and a remote server that provides an application service. This allows the mobile unit to engage in client-server transactions and file transfers while bypassing the negotiated wireless peripheral device. The mobile unit does use the negotiated wireless peripheral device to supply a client-side and non-area constrained user interface to the user. In a preferred embodiment, the mobile unit passes a remote object to the negotiated wireless peripheral. The remote object executes on the NWP device and interacts with mobile unit. The remote object performs cipher processing and memory protection processing. The mobile unit invokes an input and/or output method on a stub object that securely communicates commands and/or input/output data to the remote object.

In still another aspect of the present invention method for use with a mobile unit that uses a wireless wide area network (wWAN) air interface to communicate via a wide area network (WAN) with one or more remote servers and a wireless local area network (wLAN) air interface to contract with a negotiated wireless peripheral (NWP) device is taught. In the method, the mobile unit establishing via the wLAN air interface a position-dependent ecommerce session with the NWP device. The mobile unit then redirects at least one input-output stream to at least one peripheral supplied by the NWP device in order to allow an application program to deliver content to a non-area-constrained user interface. The NWP device supplies an input device as part of its peripheral augmentation services. The mobile unit also establishes or redirects a client-server packet stream via the wLAN and through the WAN to support an end-to-end secure session between the mobile unit and a selected remote server. The mobile unit performs cipher processing using at least one security parameter from an end-to-end security association between the mobile unit and the selected remote server. For example, the mobile unit executes an encryption algorithm using a shared-secret key and/or public-private key pairs. The mobile unit stores a secure information record and securely passes it to the remote server without the need to type in the information stored in the secure information record into the input device supplied by the negotiated wireless peripheral. This allows the user to enter passwords and other private information without the NWP device being able to intercept it. Secure object methods can also be used to augment this security measure, or this security measure can be used to augment other methods.

Another aspect of the present invention is to use a system similar to the ones above, but to use a projection display area. In this type of method, the mobile unit maintains a screen buffer and optically projects a display surface onto a larger display area to provide a non-area constrained user interface. This method strongly prevents the NWP from intercepting displayed information. The NWP preferably provides power to the mobile unit since this type of display generally consumes more power.

Still another aspect of the present invention circumvents the need for many of the peripheral services supplied by an NWP device. A mobile unit is configured with a set of peripherals that in total support an area-constrained user interface and a non-area constrained user interface. For example, certain keys, buttons, trackballs, or touch screen inputs may control aspects of either or both of the area constrained user interface and the non-area constrained user interface. The mobile unit also includes a display projector that projects a non-area constrained user interface display onto a display surface. In some models, the display projector can be an external device that is wirelessly coupled (e.g., via a Bluetooth™ session) to the base unit, e.g., a smart phone. In such a system the set of peripherals includes a pointing and selection device capable of controlling a cursor image on the projected non-area constrained. The user can further making selections by clicking on interactive portions of the projected non-area constrained user interface. In some embodiments the display is generated from a projector such as an LCD projector. In other embodiments, a fast-scanning laser is used to trace out the user-interface image. In some embodiments, three lasers are used, one being a red laser, the other a green laser and the other a blue laser.

BRIEF DESCRIPTION OF THE FIGURES

The various novel features of the present invention are illustrated in the figures listed below and described in the detailed description that follows.

FIG. 7 is a flow chart illustrating a method of processing carried out in a network server adapted to interface with a mobile unit whose peripheral configuration can be augmented by contracting with a negotiated wireless peripheral.

FIG. 8 is a flow chart illustrating business methods and methods of processing used in networks incorporating negotiated wireless peripherals.

DETAILED DESCRIPTION OF THE PREFERRED EMBODIMENTS

Figure 1:
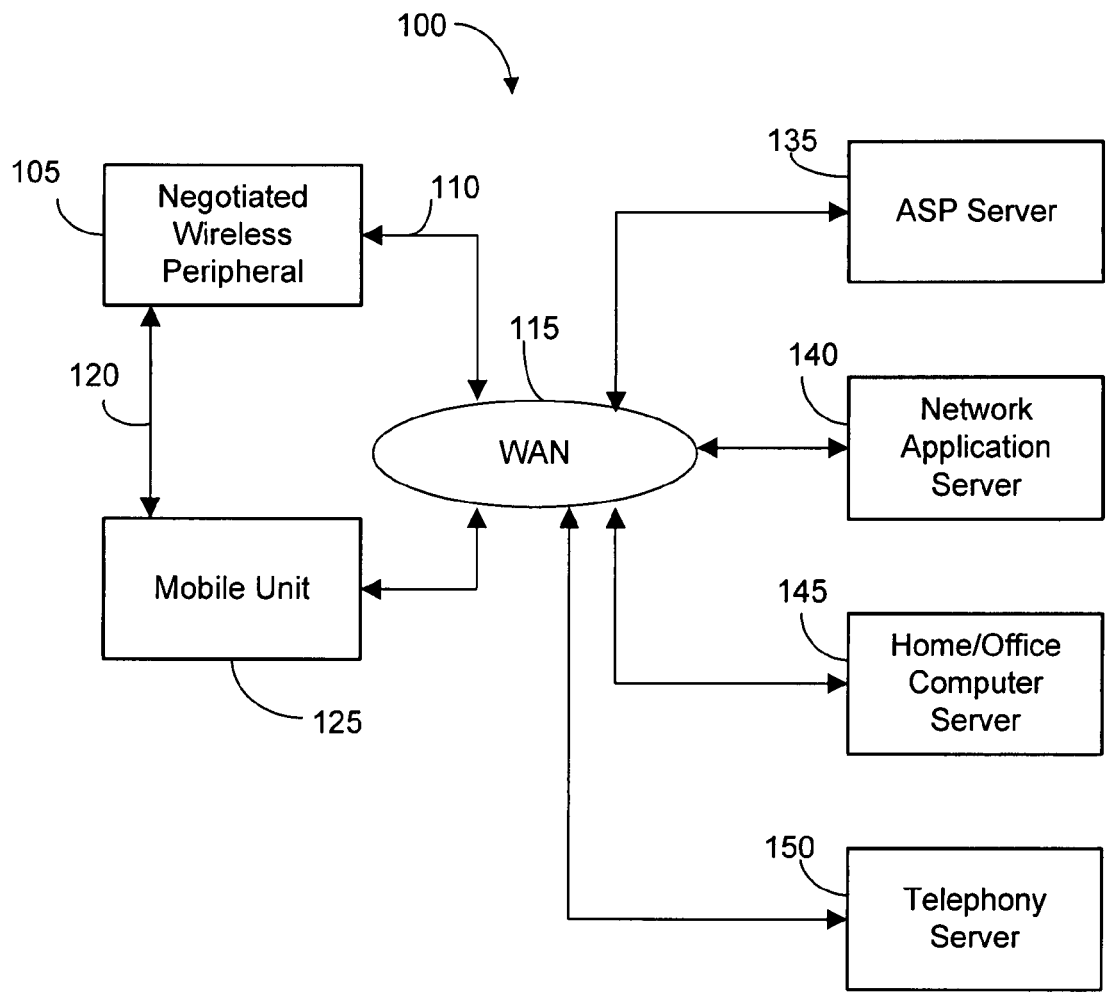
FIG. 1 is a block diagram representing an embodiment of a system involving a mobile unit, a negotiated wireless peripheral, and various server systems attached to a network.

FIG. 1 is a block diagram representing an illustrative system embodiment 100 of a system configuration used to support the present invention. The system 100 includes a NWP (negotiated wireless peripheral) 105. The NWP 105 is coupled to a mobile unit 125. As is discussed in further detail hereinbelow, the NWP 105 can correspond to a peripheral device that can be temporarily attached to the mobile unit 125 on a negotiated contract basis. For example, the mobile unit 125 may be a smart phone with a limited UI. The NWP 105 may involve a full sized display monitor, a full sized keyboard, and a mouse-pointing device. The mobile unit 125 negotiates with the NWP 105 to contract its services. Once contracted, the NWP 105 acts as an extension to the mobile unit 125 and the mobile unit 125 can act as a full-featured desktop system. As is discussed below, the NWP 105 can also be configured to provide products and/or services other than peripheral augmentations. In such cases, the NWP 105 can be thought of as a wirelessly controlled vending device. In either case, the NWP 105 joins the mobile unit 125 in a session and provides some type of product, service or peripheral augmentation to the mobile unit 125.

In the system embodiment 100, the NWP optionally includes a WAN connection 110 to a WAN 115. The WAN connection 110 can be wireless, corresponding to a wWAN (wireless wide area network) connection or can involve a wireline connection (e.g., twisted pair, coaxial cable, or fiber optic). The WAN 115 typically corresponds to the Internet, but can also correspond to an enterprise wide WAN, a VPN (virtual private network), and/or a set of switched or leased lines (DS0, DS1, DS3, ISDN, etc.) through a PSTN (public switched telephone network). In the system embodiment 100, the NWP also optionally includes a wLAN (wireless local area network) connection 120 for coupling to the mobile unit 125. The NWP preferably includes both the wWAN connection 110 and the wLAN connection 120, but in some embodiments the NWP may include only one or the other.

Also connected to the WAN 115 is an ASP (applications service provider) server 135, an NWP management server 140, an optional home/office computer system 145, and an telephony server 150. In some embodiments, only a subset of the servers 135, 140, 145 and 150 may be present.

As discussed in more detail below, the ASP server 135 (more generally called an "application server") preferably supplies global desktop services and optionally other application and file system services to the mobile unit 125. The NWP 105 preferably interacts with the NWP management server 140 (more generally called a "management server"). In such embodiments, the NWP management server 140 generally serves to control an installed base of NWP access points. For example, when the NWP 105 negotiates with the mobile unit 125 to supply a product or service, the NWP 105 uses the NWP management server 140 as a user/payment-authentication resource, a billing server, and as a record keeping server. Specific examples illustrating how the NWP 105 the NWP management server 140 interact are discussed below. In some embodiments, the NWP 105 does not interact with a server at all, but accepts digital debit payment directly from the mobile unit. However, in most of the envisioned embodiments, the NWP 105 is coupled to the NWP management server 140 and interacts therewith. In some embodiments, the ASP server 135 and the NWP management server 140 can be collocated and merged. For example, a company that supplies global desktop application services from the ASP server 135 can be the same company that manages the installed base of NWP devices from the NWP management server 140.

The computer system 145 represents a home computer, an office computer, or an enterprise computer system (e.g., an intranet or a VPN-defined subnetwork of an intranet). For example, the computer system 145 may involve a personal computer configured to provide server capabilities, or may involve a network comprising one or more PC's workstations and dedicated network servers. In either case, the computer system 145 can be used to supply desktop files and/or applications to the mobile unit 125. For example, these applications can include standard web-browser controlled applications or standard back-office computing applications. A portal software module as known in the art is used to allow the computer system 145 to make applications and files accessible to remote users. Portals enable the user of the mobile unit 125 to be able to work on applications such as back-office and desktop applications while away from the home or office.

In some embodiments, the ASP server 135 is used to host applications and files for clients (e.g., home or enterprise clients). In such embodiments, the ASP server 135 offloads the application processing from its ASP customers. The ASP customers are client devices and the ASP server is a server device. The clients and the server engage in client-server computing transactions as are known in the art. That is, a server delivers application services to a client in a client-server application session. The client-server application session typically is implemented at the application layer but can be implemented at other layers as well. Mobile client devices are typically limited by their area-constrained user interface capabilities. The ASP server 135 is also preferably is coupled to storage media, for example to a storage area network to support client file systems. Clients to the ASP server 135 act much like terminals and the ASP server 135 acts much like a network mainframe computer. One advantage of such a configuration is that customers to the ASP server 135 can access their applications from anywhere reachable from the WAN 115. This generally provides global accessibility to applications and related data. In accordance with an aspect of the present invention, the ASP server 135 provides a global desktop user interface to users. This interface allows a user to work from a client computer attached to the WAN as though he or she were working on a home office computer to include a computer system in the back office. The UI (user interface) as designed in accordance with an aspect of the present invention looks much like a standard UI of an operating system such as Windows™ or X-Windows™, for example. In this type of inventive system, the ASP 135 supplies a global desktop interface to users and this interface can be reached from a smart phone that has its peripheral set temporarily expanded by the NWP 105. When the user of the smart phone is on the road and is away from an NWP 105, the ASP server 135 supplies a limited UI customized to the hardware of the mobile unit 125.

The same basic functionality supplied by the ASP server 135 can be supplied by coupling a portal software module to the home/office computer 145. For example, consider the case where the computer system 145 corresponds to a subnetwork of computers connected together via an enterprise intranet. In this case the portal software module can be supplied to allow mobile workers to access the applications on the enterprise intranet from remote access points via the WAN 115. The portal is responsible for user authentication and access control. Similarly, the portal is responsible for supplying the same type of global-desktop UI capabilities as supplied by the ASP server 135. In some systems, for security reasons, firewall technology may be used to prohibit external access to certain data repositories and applications.

In some embodiments, enterprises may use a combination of the computer system 145 with a portal and an external ASP server 135. In such embodiments, users can log into the ASP server 135 for as first set of applications and to the portal of the computer system 145 for a second set of files and applications. Likewise, either the ASP server 135 or the computer system 145 can execute a software module that aggregates the two sources of files and applications to provide a unified interface. Optionally, the user may selectively elect to see the user interface of only the ASP 135, the computer system 145 or the merged set. Hence the present invention contemplates merging applications and file systems from different computer resources available from the WAN 115 to supply a unified interface to a user. As an example, the global desktop may include certain applications from the ASP 135 and an email application from the computer system 145 or an external email resource such as AOL™ (America on-line). In such cases, RDF (resource description framework) files may be used to describe a user's desktop UI where different windows and applications are aggregated from different network addresses. For further details of how to implement such embodiments, see the documentation of Mozilla™ based browsers and the RDF standards.

While global desktop applications have been discussed, it should be appreciated that other types of application programs beside desktop applications can be supported by the system 100. For example, the NWP 105 can supply a video conferencing UI or a video on demand UI for entertainment purposes. In general, the NWP 105 can contract to supply products and services to the mobile unit 125. In a more general embodiment, the mobile unit 125 acts as a digital authentication and payment device, while the NWP acts as a product and/or service-vending device.

The telephony server 150 can involve an Internet telephony server (e.g., SIP—session initiation protocol) or a cellular network such as a 3G (or 4G, 5G, . . . ) system. The WAN 115 can be thought of as encompassing any or all of the Internet, any attached intranets, cellular networks, and the PSTN. Communication between servers and other devices in the system 100 may involve any of these communication means or other means such as satellite based networks. More details regarding the operation of the system 100 are discussed in connection with FIGS. 2-10.

Figure 2:
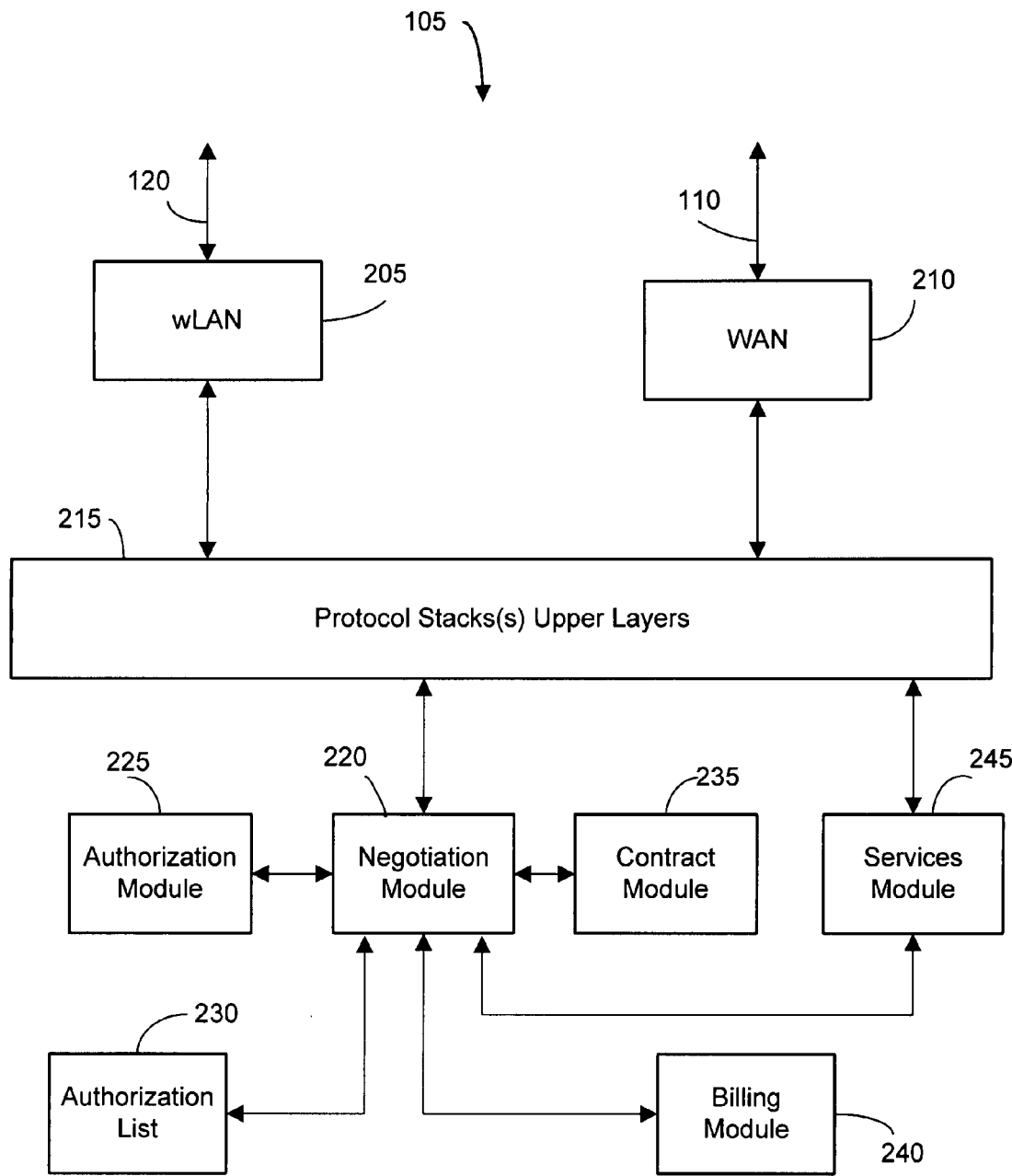
FIG. 2 is a block diagram illustrating an embodiment of a wireless negotiated peripheral.

An embodiment of the NWP 105 is illustrated in block diagram form in FIG. 2. The NWP 105 is illustrated as a hardware/software block diagram whereby certain blocks involve hardware and software, and other blocks represent software modules. This type of block diagram is also used in FIGS. 3 and 4. It is to be understood that the software modules exist in software, and in the physical embodiment the software is typically coded into a memory device that is coupled to a processor according to a Von Neumann architecture as is well known in the art. Other hardware architectures such as distributed multiprocessor architectures, programmable gate array architectures or other hardwired (possibly reconfigurable) architectures can be used to implement the hardware/software apparatus as taught in FIGS. 2-4 without departing from the scope of the present invention.

A preferred embodiment of the NWP 105 includes a wLAN transceiver 205 to support the wLAN connection 120. In addition, the preferred embodiment preferably includes a WAN transceiver 210 to support the WAN connection 110. The WAN transceiver 210 may involve, for example, a WCDMA connection (wWAN) or a wireline connection such as a fiber optic connection, a T1 line, an ISDN line, an xDSL connection, or a V.90 modem. In specific embodiments, the NWP 105 may be implemented with one or both of the transceivers 205, 210. The transceiver 205 and the transceiver 210 each support at least one lower layer of a protocol stack and are each connected to a software module 215 that implements at least one upper layer of a protocol stack. Depending on the embodiment, the software module 215 may implement one or more upper layers for either one or two protocol stacks. For example, separate protocol stacks may be used for the wLAN 205 and the WAN 210, or the same set of upper layers may be shared among the wLAN 205 and the WAN 210. Also, in some embodiments the software module 215 may be implemented as separate modules that are integrated into the transceivers 205 and 210. In either case, both the transceivers 205 and 210 are controlled by a protocol stack. In an exemplary embodiment, the wLAN transceiver implements one of Bluetooth™, HiperLAN™, IEEE 802.11, DECT™, or HomeRF™ at the lower layers and possibly TCP/IP and/or WAP™ at the upper layers. Meanwhile, in this example, the WAN transceiver implements 3G WCDMA or a wireline protocol (e.g., xDSL) at the lower layers and TCP/IP at the upper layers.

Coupled to the protocol stack upper layers is a negotiation module 220. The negotiation module 220 can be implemented at various software layers and is preferably implemented at a session layer or an application layer. It is recognized that different communication protocols use different types of protocol stacks with different types of protocol layer definitions. The appropriate layer at which the negotiation module 220 is implemented is thus dependent on the protocol stack used and the overall software design of a given embodiment. Also, as is understood by skilled artisans, the negotiation module 220 can be implemented as a sublayer or as a shim between protocol stack layers. As is discussed in further detail below, the negotiation module 220 is responsible for negotiating the use of a position-dependent ecommerce session between the NWP 105 and the mobile unit 125. Position-dependent ecommerce sessions are also defined in greater detail below.

In the embodiment shown, coupled to the negotiation module 220 is an authorization module 225, a contract module 235, an authorization list 230, a billing module 240 and a services module 245. While the interconnection of these modules is shown as a star topology whose root is the negotiation module, these modules can communicate in other ways, for example any of the illustrated software modules could communicate with one another via function calls, shared memory messaging, operating system messages, or direct hardware connections in a specific embodiment. For example, in one embodiment the authorization module 225 directly accesses the authorization list 230. Hence it is to be understood that the illustrative star-interconnection topology can be modified in specific embodiments without departing from the scope of the present invention.

It should also be noted that in some embodiments, some or all of the modules 220, 225, 230, 235, 240 and 245 may be missing. This is because embodiments that make use of the WAN connection 110 can implement various software modules in the NWP management server 140. In such cases, the WAN connection 110 is used to communicate with the NWP management server 140 and some or all of the modules 220-245 are implemented in the NWP management server 140.

Not shown in the NWP 105, but present in some embodiments, is a multiplexer. The multiplexer may be implemented at or between any of the layers of the protocol stack 215. The multiplexer is used to allow a plurality of NWP's to share network resources such as the wLAN transceiver 205 and/or the WAN transceiver 210. In such embodiments, the wLAN and/or WAN connections are shared among a plurality of service modules 245. The negotiation module 220 and its associated resources may also be shared. In such embodiments, only the services module 245 needs to be replicated. For example, in an airport, a set of NWP terminals may be provided in a waiting area to allow travelers to access their desktop applications. While the travelers may see twenty NWP access points, using the multiplexer, all of these access points may share one or more wLAN connections and a single WAN connection.

As used herein, the term "position-dependent ecommerce session" carries a specific meaning. Firstly, a position-dependent ecommerce session is position dependent. That is, the NWP 105 and the mobile unit 125 must be geographically collocated into a geographical vicinity, for example zero to one hundred feet. In many cases the geographical vicinity will be smaller, for example zero to ten or twenty feet. When wLAN technologies are involved, the size of the geographical vicinity is generally determined by the range of the wLAN technology. Also, the position-dependent ecommerce session involves an admission protocol involving one or more admission rules. A position-dependent ecommerce session is open to any station that enters the geographic vicinity, performs session set-up negotiation handshaking using the admission protocol, and satisfies the admission rules. In a position-dependent ecommerce session, a first network entity offers a product or service for sale and a second network entity uses the admission protocol to handshake with the first network entity to enter into a negotiated contract to be able to purchase the product or service from the first network entity. In one example, the admission policy involves the second entity sending a digital debit instrument (digital cash, digital check, or digital debit card), to the first entity. Similarly, the second entity can perform a credit card transaction with the first entity. Also, the second entity can authenticate itself as an account holder for the products and/or services offered by the first entity. When the first and second network entities part ways and are no longer both within the same geographical vicinity, the position-dependent ecommerce session is disconnected. Alternatively, either entity can cause the session to be ended prematurely.

While a common type of position-dependent ecommerce session is established via the wLAN connection 120, in a different type of embodiment, the position-dependent ecommerce session can be established via the WAN 115. For example, in one type of embodiment the mobile unit 125 can be implemented to include GPS receiver. Similarly, the GPS receiver might be augmented with a local positioning system (LPS) receiver to process local pseudo-satellite-like signals that allow the mobile unit to know a precise indoor location, for example. In general, the mobile unit 125 may be capable of determining its geographical position relative to reference locations. In such systems, the mobile unit couples an indication of its current position (e.g., GPS coordinates) to the NWP management server 140. The NWP management server 140 then acts as a proxy for a position-dependent ecommerce session between the mobile unit 125 and the NWP 105 access point in the immediate vicinity of the mobile unit 125. In similar embodiments, the NWP management server 140 provides parameters to the mobile unit 125 so that it can engage in a direct position-dependent ecommerce session with the NWP 105 via the WAN 115.

Position-dependent ecommerce sessions can also be set up with user intervention. In such embodiments, the NWP management server 140 offers a web-site style interface to users. Preferably the offered web-site style interface is implemented to customize content for various types of mobile clients devices. For example, the web-site style interface is written in a markup language such as WML. In such embodiments, the web-site style interface provides a dialog window to allow a user to enter an NWP identification code. The NWP identification code made visible on the NWP 105 so that a user can read the NWP identification code when the user is standing in front of the NWP 105. The user enters the identification code, and then the NWP management server 140 activates a link to allow the mobile unit 125 to communicate with the NWP 105 whose identification code was entered. This visual technique allows the mobile unit 125 and the NWP 105 to initiate a position-dependent ecommerce session without the need for a wLAN connection or a positioning device such as a GPS receiver. In a similar embodiment, the NWP 105 can display a URI or URL that can be entered directly into the mobile unit 125's UI in order to create a connection with the NWP 105. Note that the NWP identification code, URL or URI can be physically printed onto the NWP 105 or can be electronically displayed on a display surface provided by the NWP 105.

In order to implement a particular security procedure in accordance with the present invention, the services module 245 is able to execute code sent over by the mobile unit 125. For example, the services module runs a virtual machine and runs Java™ applets or servelets, depending on the programming model used in the given application. Likewise, distributed object technologies such as distributed Java objects and CORBA distributed objects can be set up between the mobile unit 125 and the NWP 105. Distributed objects include a local object and a remote object as discussed in greater detail below. The local object and the remote object work together to implement object-oriented methods across two or more machines. In this use of distributed object technology, the mobile unit 125 sets up a distributed object and retains a client-side stub object. The mobile unit 125 transmits a remote object to the NWP 105 in order to execute security code remotely in the NWP on the behalf of the mobile unit 125. The remote object is able monitor and protect access to a locked memory segment that is under the control of the services module 245. For example, the locked memory segment is a protected memory segment and corresponds to the keyboard input buffer and the frame buffer for the display. The remote object that runs in the NWP on the mobile's behalf ensures data is encrypted into and out of the protected area and also ensures that no rouge process comes in and reads or otherwise accesses the protected memory area.

In operation, the mobile unit 125 and the NWP 105 establish a position-dependent ecommerce session. The mobile unit 125 engages in the admission protocol and is then able to access products and/or services from the NWP 105. The NWP management server 140 supports the NWP by keeping user account information and/or managing digital debit and/or credit card transactions. In some cases the mobile unit 125 uses the NWP 105 to access other services such as those provided by the ASP server 135.

In one type of embodiment, the NWP 105 acts as a peripheral augmentation module for the mobile unit 125. In this exemplary embodiment, the mobile unit 125 and the NWP 105 establish a position-dependent ecommerce session via the wLAN connection 120. In order to establish the position-dependent ecommerce session, the NWP 105 receives an admission request from the mobile unit 125. The negotiation module 220 processes the admission request. The negotiation module 220 usually interacts with the NWP management server 140 who then supplies information needed to implement the position-dependent ecommerce session's admission protocol.

For example the mobile unit 125 supplies a digital debit instrument (digital cash or digital check or digital debit card), a credit card number, or a subscriber account number as a part of the admission protocol. The authorization module 225 either accepts the digital debit or uses the wWAN connection 110 to verify the credit card number or account number. Even when digital debit is used, the authorization module preferably interacts with the NWP management server 140 to have the digital debit authenticated. The optional authorization list 230 is consulted in the case the NWP 105 has local accounts, but in most cases the authorization module performs a WAN transaction with the NWP management server 140 to determine whether the mobile 125 has an account with the NWP management system. Depending on a set of parameters associated with the user, the contract module 235 sets a rate for services. For example the services may cost different amounts at different times of day, or there may be different rates set depending on whether digital debit, credit card, or an existing subscriber account contract is used for payment. In some embodiments the contract module 235 may elect to not charge any direct user fees. This might occur, for example in a restaurant that may provide free NWP 105 services to encourage customers to come in. Also, the contract module may be implemented as a part of the NWP management server 140. Different embodiments split the NWP admission and billing related processing between the NWP 105 and the NWP management server 140 in different ways.

Once the negotiation module 220 has granted the mobile unit 125 access, the services module 245 is activated. The services module 245 provides a product or service to the mobile unit 125. For example, the NWP 105 provides a peripheral augmentation service that provides access to the use of a full sized display monitor, a full sized computer keyboard, and a mouse pointing device. In this embodiment, the services module 245 activates the I/O devices by redirecting I/O streams to the mobile unit 125 via the wLAN connection 120. In embodiments where the wLAN connection 120 does not exist, the I/O streams are redirected to the mobile unit 125 via the WAN 115. In either case, the mobile unit 125 is able to temporarily function as a full desktop system. The NWP 105 may alternatively augment the peripheral set in other ways, for example it can supply a power connector to provide power to and/or recharge the mobile unit. In many cases, the mobile unit will redirect input/output streams from an indigenous, area-constrained peripheral to the augmented peripheral supplied by the NWP 105. As discussed below, the NWP may also provide a projection-based display device and/or a display surface for displaying an image generated in the mobile unit 125 by a projection-display device under the control of the mobile unit 125.

When the NWP 105 provides a display surface for a projected UI, the display surface provided by the NWP 105 by the services module 245 may be implemented to also provide touch-screen input functionality. In such a case the touch screen of the display surface is a peripheral supplied by the NWP. In such cases the display surface preferably includes cross hairs or other marks that allow the user to align the displayed image with the touch-screen display surface. Because the human finger is relatively coarse, the projection image can be sufficiently aligned to be used with touch screen inputs. Alternatively, or in addition to, a mouse provided by the mobile unit 125 or the NWP 105 may be used for making user selections. The touch-screen is an optional feature and any such combination may be used.

To continue with this example, the ASP server 135 provides a virtual desktop UI with the user's set of application programs and user files available as icons using the extended peripheral hardware supplied by the NWP 105. Another service that can be provided by the NWP 105 in this type of embodiment is WAN-traffic offloading. In embodiments involving a WAN-traffic off loading, the mobile unit 125's WAN connection is redirected through the NWP 105. This is useful mainly in cases where the NWP 105's WAN connection 110 involves a wireline connection. The NWP 105 is often able to supply WAN access to the mobile unit 125 at a lower cost than the wWAN connection provided by the cellular carrier (e.g., WCDMA carrier usage fees are higher than direct wired Internet usage fees).

In some embodiments, distributed object technology can be used to implement various NWP services. Distributed object technology allows object-oriented classes to be defined that include a remote object and a stub object (also known as a "proxy object"). The remote object implements one or more services and a communication protocol to communicate with the stub object. The stub provides the client with a set of application programmer's interface functions (called an "interface" in object-oriented programming terminology) to call functions (i.e., "invoke methods"). When a method is invoked on the stub, a remote procedure call and a set of parameters are marshaled into a message and sent across a communication channel to the remote object. The server-side remote object then receives the message, unmarshals the parameters, invokes the corresponding method on behalf of the stub object using the remote object, marshals a set of results into a message, and sends the message back to the stub object.

In accordance with an aspect of the present invention, distributed objects are defined having a stub object and a remote object residing on opposite ends of a position-dependent ecommerce session. For example, once the position-dependent ecommerce session is established and a service is contracted, the NWP 105 instantiates a remote object and sends a representation of a stub object to the mobile unit 125. The mobile unit 125 then uses a standard set of object-oriented interfaces to invoke methods (i.e., function calls) on the stub object. The stub object marshals the invocation and sends a message to the remote object residing in the NWP 105. The NWP 105 then invokes a corresponding method in the remote object in order to provide the service to the mobile unit 125. For example, the mobile unit writes to a display monitor by invoking a stub method, and the stub method marshals the method invocation and sends it to the remote object. Then the remote object executes a method to case the display monitor in the NWP 105 to be written. In general, the present invention contemplates the use of distributed objects to be set up between the NWP 105 and the mobile unit 125 to support the delivery of services to the mobile unit 125. In some cases distributed objects may also be set up between the NWP 105 and the NWP management server 140, and/or between the mobile unit 125 and the NWP management server 140.

In the case of WAN offloading, the NWP 105 sends a stub object to the mobile unit 125. The mobile unit 125 then overloads some of its protocol stack service access point methods with the methods defined over the stub object. When the mobile unit executes its WAN-based communication routines, the stub methods cause messages to be sent to the remote object in the NWP 105 via the wLAN 120 instead of being sent to the lower layers of the wWAN transceiver 310. The remote object in the NWP 105 then routes the traffic using its WAN transceiver 210. This type of redirection allows the NWP 105 to provide lower cost WAN access than can be provided by the wWAN transceiver 310. For example, a fiber-based implementation of the WAN transceiver 210 can pass traffic more economically than a 3G WCDMA transceiver in most cases.

It should be noted that the NWP 105 can be used for applications other than supplying an augmented set of peripherals and possibly a lower cost WAN connection to a mobile unit. In other embodiments, the service module 245 can provide vending capabilities to provide products and services to the mobile unit 125. In such embodiments, the NWP 105 acts like a digital vending machine and the mobile unit 125 acts as a digital authentication and payment device. The mobile unit negotiates and authenticates itself, usually with the assistance of the NWP management server 140. Once authenticated and authorized, a position-dependent ecommerce session is initiated between the mobile unit 125 and the NWP 105. The service module 245 is then used to supply the mobile unit 125 access to a product or service. Examples and further details of general vending capabilities are discussed in connection with FIGS. 5, and 8.

Figure 3:
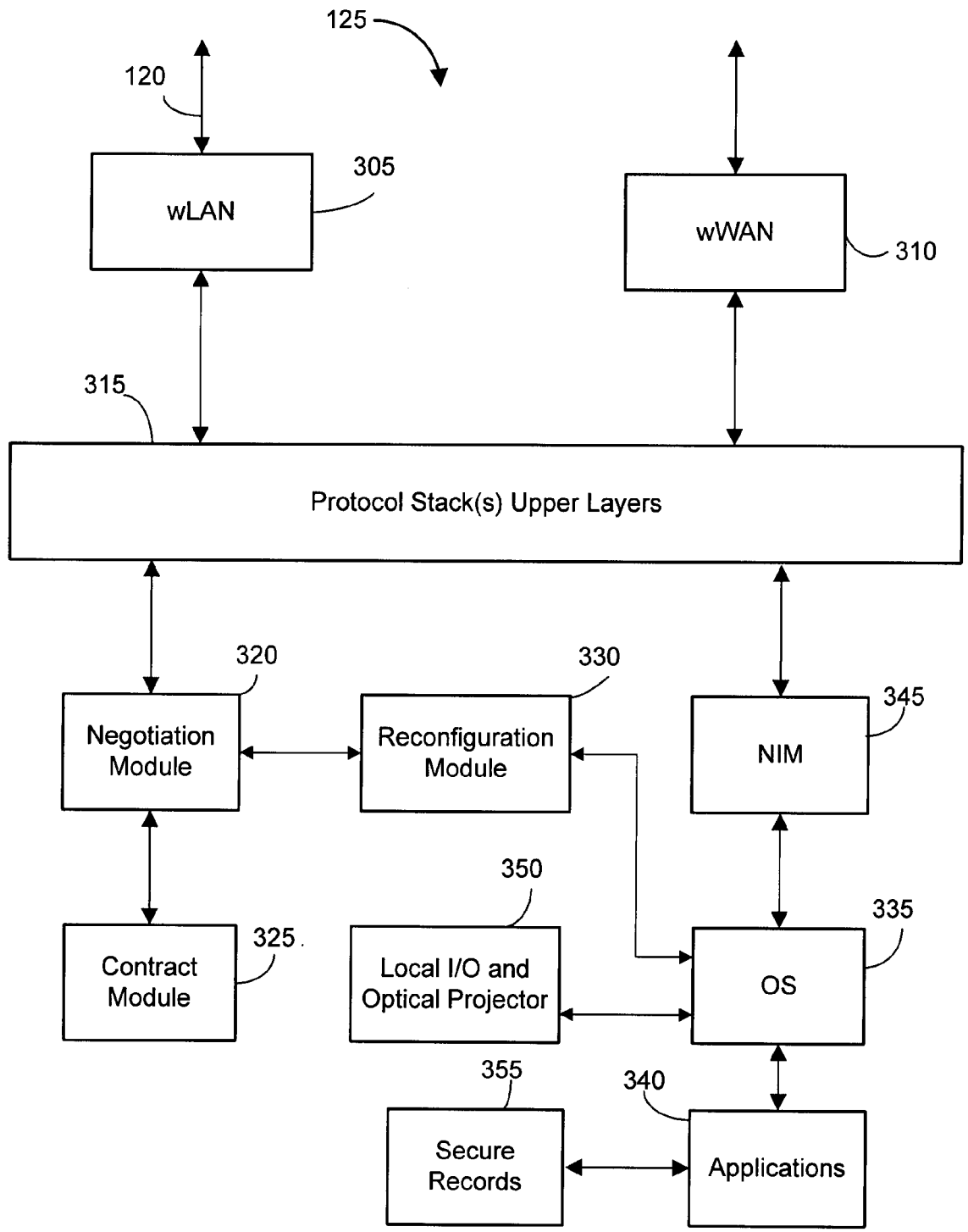
FIG. 3 is a block diagram illustrating an implementation of a mobile unit designed to interface with negotiated wireless peripheral devices and network servers.

Referring now to FIG. 3, an embodiment of the mobile unit 125 is illustrated in block diagram form. The block diagram involves a hardware/software system. The hardware architecture used to support such a system is substantially the same as discussed in connection with to FIG. 2. A preferred embodiment of the mobile unit 125 preferably includes a wLAN transceiver 305 to support the wLAN connection 120. In addition, the preferred embodiment preferably includes a wWAN transceiver 310 to support a wireless connection (e.g., satellite, 2.5G cellular, 3G WCDMA cellular, or later generation cellular). In some specific embodiments, the mobile unit 125 may be implemented with only one or the other of the transceivers 305, 310. The transceiver 305 and the transceiver 310 each support at least one lower layer of a protocol stack and are each connected to a software module 315 that implements at least one upper layer of a protocol stack. Depending on the embodiment, the software module 315 may implement one or more upper layers for either one or two protocol stacks.

For example, separate protocol stacks may be used for the wLAN transceiver 305 and the wWAN transceiver 310, or the same set of upper layers may be shared among the wLAN transceiver 305 and the wWAN transceiver 310. Also, in some embodiments the software module 315 may be implemented as separate modules that are integrated into the transceivers 305 and 310. In any case, each of the transceivers 305 and 310 are controlled by a protocol stack. In an exemplary embodiment, the wLAN transceiver implements one of Bluetooth™, HiperLAN™, IEEE 802.11, DECT™, or HomeRF™ at the lower layers and possibly TCP/IP and/or WAP™ at the upper layers.

Coupled to the protocol stack upper layers is a negotiation module 320. The negotiation module 320 can be implemented at various software layers similarly to the negotiation module 220 as discussed in connection with FIG. 2. The negotiation module 320 is responsible for negotiating the use of a position-dependent ecommerce session between the mobile unit 125 and the NWP 105.

In the embodiment shown, coupled to the negotiation module 320 is a contract module 325, and a reconfiguration module 330. While the interconnection of these modules is shown as a star topology whose root is the negotiation module 320, these modules can communicate in other ways. For example any of the illustrated software modules could communicate with one another via function calls, shared memory messaging, operating system messages, or direct hardware connections in a specific embodiment. Also, in some embodiments the negotiation module 320 may interact with a server side entity such as the NWP management server 140 who in this case manages a customer account related to services provided by the NWP 105.

The mobile unit 125 also includes an OS (operating system) 335. The OS 335 provides a UI (user interface) to the user via a display screen and possibly a voice enabled operating system interface. To the OS 335 is coupled a set of one or more application programs 340. The application programs 340 access the OS 335 for services such as input and output. The OS 335 is also coupled via a NIM (network interface module) to the upper layers of the protocol stack 315. For example, in a preferred embodiment, the NIM translates socket service method invocations into transport level messages for use by the protocol stack upper layers 315.

In operation, the mobile unit 125 establishes a position-dependent ecommerce session with the NWP 105 using the wLAN connection 120. In embodiments where no wLAN connection is present, session between the mobile unit 125 and the NWP 125 is established via the WAN 115 as discussed in connection with FIG. 2. The mobile unit 125 sends a transmission to the NWP 105 requesting the position-dependent ecommerce session. The negotiation module 320 communicates with the negotiation module 220 in order to establish the session. The contract module 325 is used to supply user authentication parameters or to support a digital debit or a credit card transaction. In some instances no charge may be assessed. In such cases the contract module may still be asked to supply user identification data such as a digital signature or certificate.

The contract module 325 and the negotiation module 320 allow the mobile unit 125 to negotiate and contract to establish admission to a position-dependent ecommerce session. The contract module 325 and the negotiation module 320 allow the mobile unit 125 to act as a digital authentication and payment device. For example, if the NWP 105 comprises a vending machine, the contract module 325 can be used to purchase a candy bar or a soft drink, and payment can be made by digital debit, a credit card transaction, or a charge to a user account.

Returning to applications where the NWP 105 supplies peripheral device extension services, once the negotiation module has negotiated a position-dependent ecommerce session and contracted for peripheral augmentations, notification is delivered to the reconfiguration module 330. The reconfiguration module involves software and/or a data structure that causes a device registry with the OS 335 to be modified. A device registry is a data structure or process that identifies a set of peripheral devices and/or device drivers that are in current use by the OS 335. In some embodiments, a device reconfiguration message is coupled to the one or more of the application programs 340. In other embodiments, a reconfiguration message is coupled from the OS 335 via the NIM 345 and the protocol stack 315, 310 to the ASP server 135. In either case, a peripheral-device-reconfiguration message is coupled either from the OS 335 or the application program 340 to the ASP server 135. This message notifies the ASP server 135 that an augmented (possibly changed or added to) set of peripherals are available to the mobile unit and subsequent content should be customized accordingly.

The peripheral-device-reconfiguration message allows the ASP server 135 to customize content for the mobile unit 125 given its modified set of peripherals. When the position-dependent ecommerce session is terminated, another peripheral-device-reconfiguration message is sent to allow the ASP server 135 to once again customize content for the mobile unit 125 given its original set of peripherals. For example, the mobile unit 125 is temporarily coupled to the NWP 105 and the mobile unit 125 is then reconfigured as a full desktop system. FIGS. 5-8 describe in greater detail some exemplary coordinated operations involving the mobile unit 125 and the NWP 105.

In some embodiments, the user may connect their own folding keyboard, an extension monitor display device, and a mouse, to an otherwise area-constrained device. In such cases, ASP server 135 can be configured and operated to practice the same basic methods as described herein in order to reconfigure the content to be customized for the augmented set of non-area constrained peripherals.

In some embodiments software radio techniques may be employed. For example, the lower layer protocols of the wLAN may be software defined and vary from NWP to NWP or from region to region. To maintain flexibility in such situations, a standardized ping message may be transmitted via the wLAN 305, possibly at a set frequency or via an IR link. Optionally the ping can be sent via the wWAN using GPS coordinates, local positioning information, or user entered information such as an NWP identification code, URI or URL read off of the NWP. This allows the NWP management server to download an appropriate software radio definition to the mobile unit 125. The downloaded software radio definition may include software modules or pointers to a table of software protocol routines already loaded into the mobile unit 125. In either case, the mobile unit 125 executes the identified lower layers in order to communicate via the wLAN. Software radio techniques can also be used to reconfigure the wWAN transceiver 310 when traveling into different WAN system areas. The methods and systems described in this application can be merged and applied along with the methods and systems of the CIP-parent applications, i.e., U.S. patent application Ser. No. 09/698,882, filed Oct. 27, 2000 and U.S. patent application Ser. No. 09/722,981, filed Nov. 27, 2000 which are hereby are incorporated herein by reference. The mobile unit 125, NWP's 105 and the servers 135 and 140 of the present application may be used to embody the hardware and software techniques taught in the incorporated-by reference parent CIP applications. In some preferred embodiments, the NWP's 105 of the present invention support software radio extension features and IP-telephony gateway features as taught in the parent applications. Any blocks or steps taught in the parent applications can be added to the block diagrams or flow charts of the present application. In addition to other features, the NWP's 105 of the present invention adds new features such as generalized vending and peripheral augmentation capabilities to the access points in the parent applications. The methods 500-800 can also be augmented with the teachings of the parent applications, where applicable.

In accordance with a security-related aspect of the present invention, a local I/O module and optional projector 350 is also illustrated in FIG. 3. The local I/O module 350 is used to support an area-constrained user interface for cases when the mobile unit is not coupled to the NWP 105. In accordance with a security and added functionality aspect of the present invention, the local I/O devices 350 also include an optional projection-display projector. The optional projector can be a projector such as an optical projector that projects an LCD screen image onto a projection surface. The projection surface may optionally supply touch screen input capability when the projected UI image is properly aligned with one or more reference points on the display surface. As the optics for such projectors are currently bulky and power-hungry, the projector may optionally be a scanning laser projector. A scanning laser projector scans out a picture either by drawing it, or by raster scanning and turning the laser on and off quickly for each displayed pixel in the image (or sub-image). In accordance with the present invention, three lasers can be used in the scanning laser, one red laser, one green laser, and one blue laser. Using this arrangement, the projector can project and RGB (red-green-blue) full color image. This projector is able to project a non-area constrained display surface onto a projection surface. As subsequently discussed, more lasers can be used to trace out or raster scan sub-images to reduce flicker effect.

The display projector of the local peripheral set 350 can be built right into the mobile unit 125 or can be implemented as a separate peripheral such as a Bluetooth™-coupled peripheral. When scanning laser technology is used, such a peripheral can be very light weight. As discussed subsequently, a small laser projector can also be built into a small portable keyboard device that is also preferably coupled to the rest of mobile unit 125 via a Bluetooth™ connection. In any such embodiments, a frame buffer is preferably built into the same physical device that houses the projector system so that that raster scan and/or laser-drawing signals do not need to be continuously sent over the air.

The optional projector aspect of the local peripheral set 350 allows the mobile unit to maintain full control over the frame buffer. This is a security aspect of the present invention because it alleviates the need for the NWP 105 from ever having access to the frame buffer at all. In an exemplary usage, the mobile unit 125 contracts with the NWP for a back-haul wireline link (e.g., Internet and/or telephony gateway service) to free the mobile 125 from using its more costly wWAN connection. The NWP also may supply supplies a keyboard and a power connector. The NWP 105 then provides a display surface where the mobile unit 125 can project a clean screen image. In some NWP embodiments a hooded area is provided to maintain lighting at an optimum level for viewing the projected display. This also provides the user with added privacy for his or her screen information. In a preferred embodiment, the NWP 105 is used at a lower communication layer but the mobile unit 125 maintains an end-to-end secure link with a remote network sever such as the ASP server 135. In such an embodiment, the NWP 105 can only intercept keyboard inputs. As discussed earlier, in some embodiments a remote object acting on behalf of the mobile is used to encrypt keyboard data and/or store it in a protected memory area to keep it from being revealed to rouge processes and hackers.

The local I/O and optional projection display 350 may include devices that are connected via the NIM 345. For example, the projector device may be embodied as an external Bluetooth™ peripheral, or may require cabling to the mobile unit 125. In other embodiments, the projector (e.g. the scanning laser(s)) can be built into the mobile unit 125. In some other embodiments the mobile unit accesses an ultra-thin (possibly folding) keyboard (part of the local peripheral set 350). This ultra-thin and possibly folding keyboard is preferably securely coupled to the mobile unit 125 via a Bluetooth™ connection. Using the projector and the thin keyboard and possibly a Bluetooth™ mouse or a button attached to the mobile unit itself for mouse control, the mobile unit 125 can provide a non-area constrained user interface. In such a configuration, no NWP at all is needed. Such a scenario could be used in a hotel room. The hotel room may optionally provide a specific projection-display surface, or a wall could be used. In such a configuration an external power source is desirable, because the projector display will consume more power than many of the other components. An NWP 105 may be useful to reroute data traffic from the wWAN to a back-haul wireline interface using the wLAN connection whereby the NWP 105 servers as a WAN gateway. Also, in public areas such as airports, the NWP 105 may provide a power source so the smart phone's optional projector 350 will not run down the battery too quickly. The NWP may contract to also provide a keyboard and/or a mouse to the mobile unit 125.

In embodiments where the projector 350 is an external (e.g. Bluetooth™) peripheral, the user can use the smart phone as the main mobility device. For example, the smart phone is used for telephone and mobile Internet applications. Meanwhile, the ultra-thin keyboard and an ultra-thin projector can easily fit in a briefcase or purse. When the user is sitting down near a wall, a non-area constrained user interface becomes available in a very small area and with a very light weight. When the light keyboard and the projector are attached (e.g., via Bluetooth service discovery and system reconfiguration), the smart phone reconfigures itself as a desktop unit. Upon reconfiguration, the smart phone sends a reconfiguration message to a server such as the ASP server 135. The reconfiguration methods discussed throughout for use with NWP devices can also be used with non-NWP assisted reconfigurations as just described. In some cases, though, an NWP will still be useful for contracting power and gateway services to the reconfigured mobile desktop system.

In accordance with another aspect of the present invention, the local I/O and projector 350 includes an external, light weight and possibly folding keyboard with an integrated projector. In such systems, the projector is built into the same enclosure as the keyboard. In the front of the keyboard is an aperture where a set of one or more lasers (e.g., RGB laser set) emits the scanned or drawn UI image. The user uses either a button on the smart phone (more generally the mobile unit 125) or on the keyboard 350 to perform mouse/trackball operations. Note that this embodiment provides the user with a non-area constrained UI in a minimal amount of area. In such embodiments, the user carries a smart phone, possibly affixed to his or her belt. The small keyboard (possibly folding) is carried in a purse, briefcase, or suitcase. The user makes use of the mobile aspects of the smart phone for calls and mobile Internet services, for example. When the user needs to do desktop work, the user parks near a display surface such as a screen, a wall, or the NWP 105 implemented with a projection-display surface area. The user preferably plugs the equipment into a power connector and begins to work with the non-area constrained user interface. WAN communications can be provided by the mobile unit 125's wWAN transceiver or by the NWP 105 (acting as a WAN gateway), depending on whether the NWP 105 is available and the user's preference.

Another security aspect of the present invention is the inclusion of a secure information record 355. The secure information record 355 holds a secure information that is to be transmitted to a remote server such as the ASP server 135. The secure information record may be arranged in a fixed format such as known in the art of data structures. Alternatively, the secure information record 355 can be encoded into a language such as resource description framework (RDF™) or eXtensible Markup Language (XML™). Such language can be generated automatically by a program in response to a user filling out a form, for example. The secure information record 355 holds a specific set of information needed to establish a secure session, provide financial information or to otherwise provide pre-packaged secure information. In general, there may be plural secure information records stored in the record area 355. A given secure information record is transmitted in response to a user selection such as a menu selection.

For example, when the user is using the NWP 105 and interacting with the server 135, the user may need to enter a password to log onto the server 135. The user may also need to pass financial account data such as a credit card number or banking information to the server 135. If this information is typed into the keyboard supplied by the NWP 105, the user may not feel 100% secure about whether in information was hacked by a potentially non-trustworthy NWP device. To prevent the user from needing to type in sensitive information, certain information such as passwords and financial account numbers or pre-stored messages can be sent without the user entering the information into the keyboard or voice interface device supplied by the NWP 105. The secure information record 335 is transmitted over an end-to-end link between the mobile unit 125 and the ASP server 135 (or some other server). Alternatively, the secure information record can be encrypted individually and transmitted over a non-end-to-end secure link. In either case, the secure information is protected from snoopers in the WAN or snoopers within the NWP 105.

Note that when the NWP 105 uses a projection display area and secure information templates are used, then the NWP 105 is never privy to secure information. The projection display is used to keep potentially secure information out of the frame buffer of the NWP 105. The secure information records are used to prevent secure information from entering into the keyboard-input buffers of the NWP. This provides an added -layer of protection over the distributed object methods described herein for protecting sensitive information for use with NWP systems.

Figure 4:
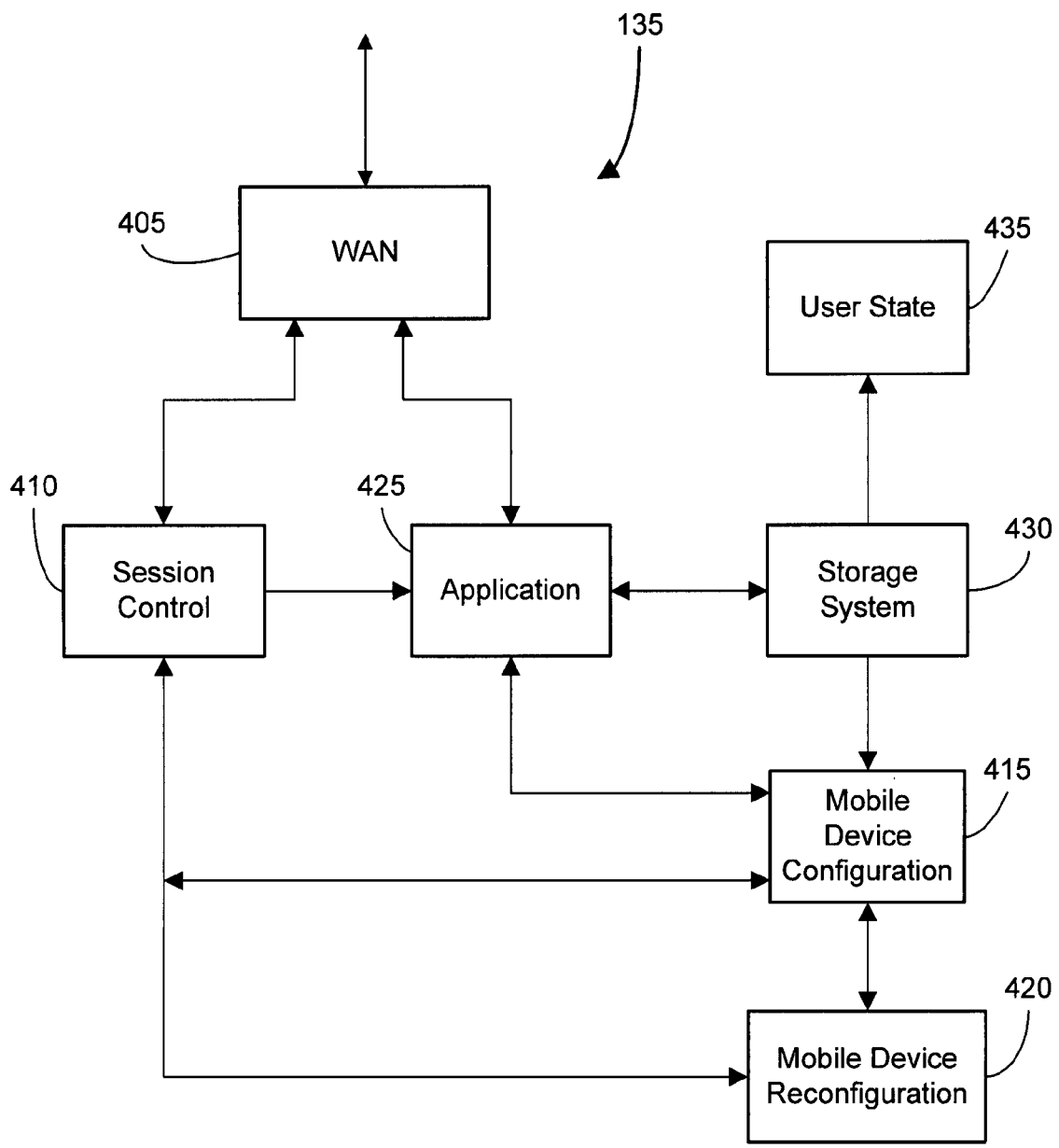
FIG. 4 is a block diagram of a network server or portal adapted for operation with mobile units that contract peripheral services with negotiated wireless peripheral devices.

FIG. 4 illustrates an embodiment of the ASP server 135. The ASP server 135 includes a WAN interface 405. The WAN interface 405 can involve a LAN connection that is interconnected to a WAN, or a direct WAN interface. In most embodiments the physical layer of the WAN interface involves a wireline connection such as a fiber, a phone line, or an xDSL line. In some embodiments, the physical layer may involve a wireless interface, for example a WCDMA cellular link or a satellite link. In the embodiment shown, the WAN transceiver includes the upper layers of the protocol stack, but it is understood that these upper layers can also be provided by the operating system (not shown) and/or the application programs running on the ASP server 135's hardware.

Coupled to an upper layer of the WAN interface 405 is a session control module 410. The session control module implements user authentication and access control processing. Also coupled to an upper layer of the WAN interface 405 is an application module 425. The application module 425 is coupled to a storage system 430 comprising semiconductor memory and/or disk storage memory. In some embodiments, the storage system 430 is coupled to storage areas involving a user state 435. Also coupled to the application module 425 is a mobile device configuration module 415. The mobile device configuration module keeps a record of the peripheral device types associated with a client device such as the mobile unit 125. The mobile device configuration module is coupled to the storage area 430 and is used to store the current device configuration of the client device.

Also coupled to the mobile device configuration module 415 is a mobile device reconfiguration module 420. The mobile device configuration module 415 and the mobile device reconfiguration module 420 are both coupled to the session control module 410. In some embodiments, the mobile device configuration module 415 and the mobile device reconfiguration module 420 are implemented as a single configuration/reconfiguration software module. The ASP server 135 can be implemented as a local or a remote portal to the computer system 145. In such embodiments, the application 425 and part of the storage system 430 can be located in the computer system 145.

In operation, the ASP server 135 provides device-customized content to mobile devices. For example, the ASP server 135 may implement XML and/or WML features that allow content to be customized for interactive display on specific mobile units corresponding to specified models of mobile units produced by specific manufactures. Such devices generally only have hardware support for area-constrained user interfaces. When the mobile unit contracts with the NWP 105, the ASP server 135 modifies the way content is delivered to the mobile unit 125 in order to accommodate the services provided by the NWP 105. For example, the mobile unit 125 and the NWP 105 become coupled together via a position-dependent ecommerce session, the peripheral configuration of the mobile unit is updated, I/O streams are redirected from the mobile unit 125 through the NWP 105, and the combination of the mobile unit 125 and the NWP 105 is able to provide a non-area constrained user interface to the user of the mobile unit 125.

In an exemplary embodiment, the ASP server 135 provides a set of desktop applications to a user. As an example, these desktop applications involve a set of application programs as would be loaded onto a desktop computer running the a Windows™ operating system. Depending on the current mobile device configuration, the ASP server 135 delivers content customized to the mobile unit 125's indigenous peripheral set or to an augmented peripheral set as augmented by the NWP 105. When the mobile unit 125 contracts with the NWP 105 to receive a full set of desktop peripherals, a peripheral-state reconfiguration message is sent to the ASP 135 in order to allow content to be customized for the reconfigured set of peripherals.

Any of the systems of FIGS. 1-4 or the methods of FIGS. 5-8 can be implemented using mobile Internet protocol (Mobile IP) technologies. Mobile IP is currently defined in RFC2002, RFC2003, RFC2004, RFC2005, and RFC2006. Related tunneling RFC1701 and management RFC1905 techniques are commonly used with Mobile IP systems. As is presently discussed, the present invention is compatible with the current Mobile IP technologies and the same concepts are expected to apply when future releases of the Mobile IP standards become available.

With the present invention, and in accordance with Mobile IP technologies, a NWP 105 can be configured as a Mobile IP "foreign agent." Meanwhile, the mobile unit 125 can be configured as a Mobile IP "mobile node" that can change its point of attachment to the Internet from one link to another while maintaining any ongoing communications using its permanent IP (internet protocol) "home address." In mobile IP systems, associated with the mobile unit is a "home agent." The home agent is a router with a link on the mobile node's "home link." The mobile node keeps the home agent informed of the mobile node's current location. For example, the mobile unit 125 can correspond to a 3G cellular smart phone with voice and data services. In this example the telephony server 150 is operated by a WCDMA carrier and acts as the home agent. In other examples, the telephony server 150 can be considered to be a home agent other than a WCDMA carrier, but for the present discussion, assume the home agent is the WCDMA carrier that supplies voice and data services to the mobile unit 125. The home agent receives packets sent to the mobile IP address associated with the mobile unit 125 and tunnels them to the mobile unit 125 when the mobile unit 125 currently connected to the Internet via a foreign agent. The foreign agent sends a message to the home agent when the mobile unit registers with the foreign agent so that the home agent can route packets to the foreign agent in care of the mobile unit 125. This paradigm provides for seamless roaming between homogeneous and heterogeneous networks (networks that respectively use the same or different air interface protocols).

In accordance with the present invention, the NWP 105 periodically sends out Mobile IP "agent advertisement messages" using the wLAN transceiver 205. The mobile unit 125 is initially provided Mobile IP services by its home agent, for example the telephony server 150 corresponding to a 3G WCDMA carrier (or for example a 2.5G GPRS or EDGE carrier, or a 4G carrier in future systems). The mobile unit 125 maintains its always-available IP connection with the server 150. Also, the mobile unit 125 monitors the wLAN connection to listen for agent advertisement messages. When the mobile unit needs to access the Internet (WAN 115 in general), it receives a cost parameter from the NWP 105 and compares the cost to the cost for WAN services offered by the telephony server 150. If the NWP service cost is lower, the mobile unit 125 and the NWP 105 establish a position-dependent ecommerce session and the mobile unit changes its point of attachment to the WAN 115 by selecting the NWP 105 to be its foreign agent. In this case the NWP provides a lower cost WAN traffic bearer service to the mobile unit 125.

In alternative embodiments, the mobile unit can establish the position-dependent ecommerce session using other means than receiving the agent advertising messages. For example any of the aforementioned methods used to initiate the establishment of a position-dependent ecommerce session can be used to initiate a foreign-agent session with the NWP 105. These alternative methods of session initiation may be desirable to conserve power to allow the wLAN transceiver to be powered down. In general, Mobile IP technology can be used with any of the systems and methods taught herein to provide seamless roaming between NWP providers and larger carrier providers. For example, a voice telephone call could be implemented using voice-over-Internet technology and the aforementioned methods could be used to reroute the call to an NWP access point.

For example, in a mobile unit, a method of least-cost packet routing involves a mobile unit that receives a mobile IP home agent advertisement from a wWAN carrier such as the server 150. The mobile unit registers with the home agent. Traffic that is sent to the mobile IP address associated with the mobile unit is thereby directed to the mobile unit via a link between the mobile unit 125 and the telephony server 150, e.g., via the wWAN transceiver 310. Next the mobile unit 125 receives a mobile IP foreign agent advertisement from the NWP 105 via the wLAN transceiver 305. The mobile unit 125 then compares a monetary cost associated with traffic bearer services provided by both the wWAN carrier (e.g., 150) and wLAN access point (NWP 105). If the bearer service cost associated with the NWP 105 wLAN is lower, the mobile unit registers with the NWP 105 to cause the network attachment point associated with the mobile unit's mobile IP address to be reassociated with the NWP 105. That is, the NWP 105 becomes the foreign agent of the mobile unit 105, and the mobile unit 125 compensates the NWP 105 by establishing a position-dependent ecommerce session and providing payment using any of the payment methods as discussed in connection with previous and subsequent methods.

Figure 5:
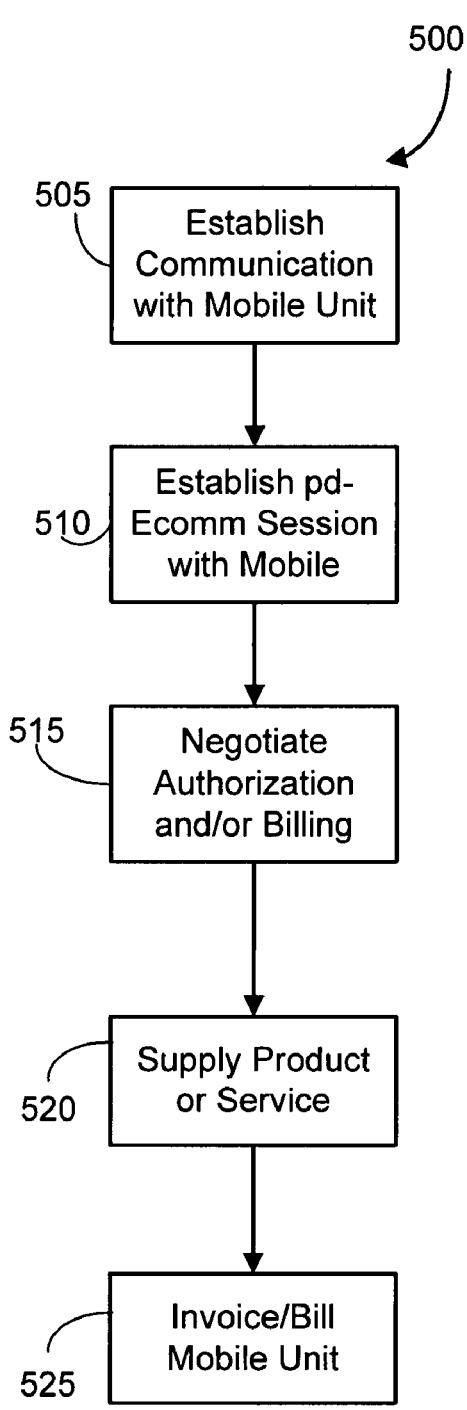
FIG. 5 is a flow chart illustrating a method of processing carried out in a negotiated wireless-vending device such as a negotiated wireless peripheral.

Referring now to FIG. 5, a method 500 is illustrated in block diagram form. The method 500 is practiced by the NWP 105 or a similar device. First the NWP 105 establishes communication with the mobile unit 125 (505). The communication may be established via the wLAN link 120. As previously discussed, in some embodiments initial communication is established via the WAN 115.

Once initial communication has been established, a handshaking sequence is executed (510) with the mobile unit 125 to establish a position-dependent ecommerce session. The position-dependent ecommerce session is established according to any of the previously discussed procedures involving the wLAN connection 120 or the WAN 115. Various types of user authentication and session encryption (e.g., IPSEC, VPN, and certificate authority-based techniques) are preferably used to secure the link between the NWP 105 and the mobile unit 125.

Next a billing arrangement is negotiated (515) with the mobile unit 125. The mobile unit 125 typically supplies digital debit, a credit card account, a debit account, or a customer account number to set up the billing associated with the position-dependent ecommerce session. As noted hereinabove, in some instances the NWP services may be provided free of charge, for example to entice a customer to patronize to a restaurant or hotel. In such cases the billing 515 involves no-charges.

Once the session is established and the billing has been authorized, the NWP 105 supplies at least one product and/or service to the mobile unit 125 (520). As discussed previously, the NWP can act as a wirelessly controlled vending machine whereby the mobile unit 125 acts as a digital authentication and payment device that controls digital debit disbursement, credit card transactions and/or customer account transactions. The NWP 105 may vend for example, candy bars, soft drinks or other products dispensable by a vending machine. Likewise, the NWP 105 may grant access to an event such as a sports event, a concert, or movie. The NWP 105 may provide access to other types of services such as a doctor's office visit. The NWP may also provide computerized peripheral services such as the supplying of a full set of desktop peripherals and/or a use of a temporary wireline connection for voice, video and/or data. Another service that the NWP 105 may supply is power service. That is, the NWP may contract to activate a power connector for use by the mobile unit 125 for immediate use and to recharge a battery in the mobile unit 125. Similarly, the NWP 105 can provide telephony services by acting as an IP-telephony gateway to provide lower cost telephony services to the mobile unit 125.

In accordance with a security aspect of the present invention, when the NWP 105 supplies a peripheral service, it provides a protected memory area for buffering/storing input and/or output data. For example a keyboard-input buffer is stored in a protected memory area and a frame buffer is stored in the protected memory area. In 510, the NWP 105 may also accept a remote object transmitted from the mobile unit 125 to act on behalf of the mobile unit 125 to ensure the protection of the protected memory area. This remote object may be used to monitor the protected area or otherwise disable other processes from accessing the protected information. Similarly, the remote object that executes in the NWP 105 may be used to support another layer of session security so that any input/output data transmitted between the mobile unit 105 and the NWP 105 is secured between the remote object and the associated stub object that runs on the mobile unit 125.

The NWP may also provide information services, such as where a user can find a specific product, service or professional in a specified locality. In such cases the NWP 105 acts as an information kiosk that supplies information and transmits it to the mobile unit. For example a user may request information from an information kiosk and the information kiosk may supply a file that includes hyperlinks to related information and directions from the mobile unit's current location to the product or service of interest. If the mobile unit supports GPS, the information kiosk may supply a Java applet that allows the mobile unit to receive position-dependent directions from a current location to the desired destination.

Or, the NWP may provide other types of services such as a video conferencing peripheral augmentation or a video viewing extension. In some cases, the NWP 105 may be configured to download purchased software or data files to a user, for example, music, video or application programs. NWP's can also be configured to process orders. Alternatively, an NWP can be set up in a restaurant to provide a digital menu and to allow the user to place an order from his smart phone. Similarly, a user in a store might make a purchase from his smart phone and the NWP could print out a receipt. In such systems the NWP may also provide a bar code reader to help the user ring up a set of products. This service would allow users to make purchases without standing in line. A human or electronic validation system would be used to ensure the user purchased items properly prior to leaving the store.

Optionally, the NWP 105 generates an invoice for services rendered (525). This invoice may be a digital invoice that is used as an intermediate data record used to charge the user for the product or service rendered. The mobile unit 125 is also optionally billed for the product or service provided by the NWP 105.

The method 500 also defines a business method. An NWP-business involves supplying one or more NWP access points as illustrated in FIG. 1. The business method also involves negotiating a price for supplying peripheral services to a mobile unit (515). The business method also involves supplying a product or service to the mobile unit (520). In specific embodiments of the business method, the product or service involves temporarily providing an augmented set of peripherals for use by the mobile unit 125. Any of the other products or services listed above can also be sold by the NWP 105, as well as other products and services not explicitly listed herein. An exhaustive enumeration of all products and services that can be sold by an NWP 105 would be excessive. The business method also involves charging for providing the product or service by the NWP 105 (525). In a specific embodiment, 525 involves providing an extended set of peripherals to the mobile unit 125.

Figure 6:
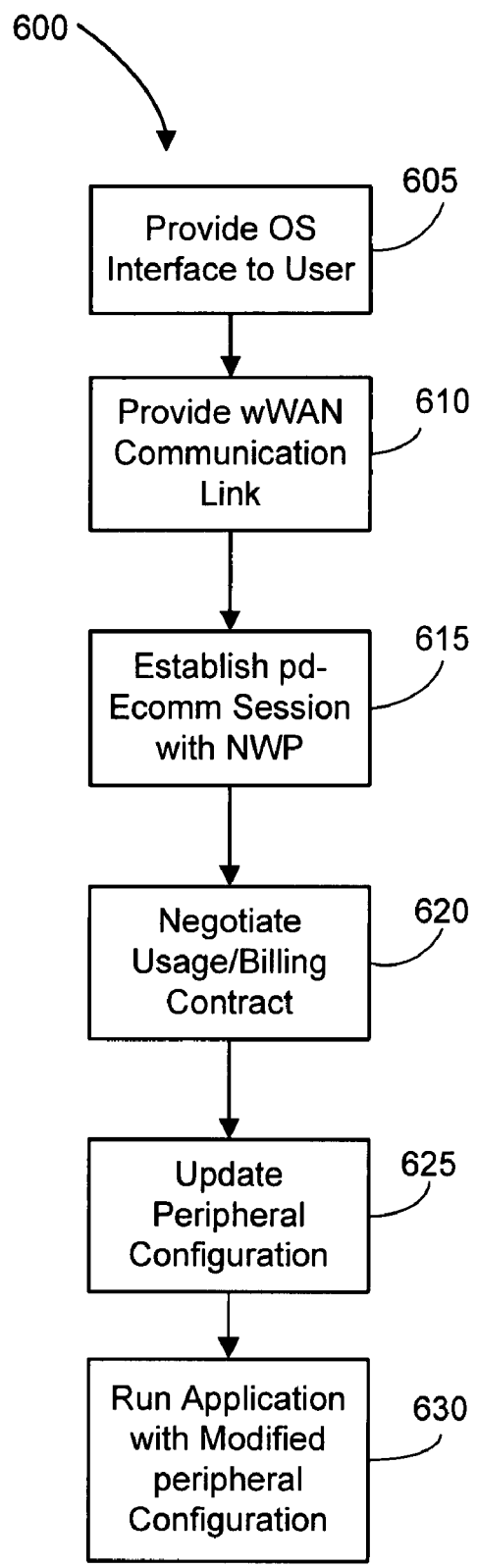
FIG. 6 is a flow chart illustrating a method of processing carried out in a mobile unit adapted to interface with a negotiated wireless peripheral.

FIG. 6 is a flowchart illustrating an embodiment of a method 600 of processing in the mobile unit 125. The mobile unit 125 provides a device-specific (e.g., smart phone) user interface to a user (605). The device specific user interface involves an operating system that supplies an interactive image or set of buttons to a user. In some embodiments the operating system provides a speech recognition based voice interface, and in still other implementations a combination of icon screen images, physical buttons, and a voice interface is used to build a hybrid type of user interface. For example, the device-specific user interface allows the user to activate application programs, place telephone calls, and interact with networked data servers such as Internet servers. In the discussion that follows, the mobile unit 125 is assumed to be a smart phone.

A WAN communication link is provided by the smart phone (610). The WAN communication link can be implemented, for example, using 2.5G, 3G or the emerging 4G mobile communication system technologies. In the future, later generation cellular or PCS systems may be similarly used. The WAN link can connect the mobile unit 125 to the public switched telephone network, the Internet, a satellite communications and/or data network, or other types of networks such as a dedicated WAN operated by a government organization or a large private enterprise.

A position-dependent ecommerce session is established with the NWP 105 (615). In some preferred embodiments, the position-dependent ecommerce session is established using a short-range wireless protocol such as IEEE 802.11, Bluetooth™, HiperLAN™, HomeRF™, or DECT™. In some embodiments, the position-dependent ecommerce session is established via the WAN connection using any of the previously discussed techniques for establishing a position-dependent ecommerce session via a WAN.

Also, a billing contract is negotiated (620). This can be done in using digital debit, a credit card transaction, or a subscriber account transaction as previously discussed. Computer security methods such as user authentication, certificates and session encryption are preferably employed to protect from various forms of fraud.

For example, in a preferred embodiment, an IPSEC-compliant VPN is set up between the NWP and the NWP management server 140, and an IPSEC-secured IEEE 802.11 or Bluetooth™ connection is established between the mobile unit 125 and the NWP 105. The mobile unit 125 sends its account information to the NWP 105 and the NWP 105 sends the account information to the NWP management server 140. In this example IPSEC digital signatures and encryption keys are used to authenticate the identity of the user and are also used for access control. In some embodiments the user may be further asked to supply a password to protect form the scenario where the mobile unit 125 is stolen and falls into the wrong hands. An override, like "remember user password" may be supplied so that the user does not have to reenter passwords for those who find this extra layer of password protection cumbersome.

Next, a peripheral configuration is modified in the mobile unit 125 (625). In a preferred embodiment the mobile unit's OS has a registry or some related type of data structure that lists the devices and/or device drivers in current use by the mobile unit 125. The registry is updated so that the local peripherals become temporarily disabled and the peripherals of the NWP 105 become enabled. In some embodiments the registry is updated so that the NWP peripherals are added but the local peripherals may remain enabled. In this type of embodiment both the original and augmented sets of peripherals are available at the same time. In such cases, the NWP peripheral set can take precedence over the local peripherals so that the ASP server 135 can deliver content customized to the NWP-expanded peripheral set. In other embodiments, the server 135 and/or the NWP management server 140 can deliver content to both the NWP-augmented peripherals and the local peripherals of the mobile unit 125.

Once reconfigured, the mobile unit 125 runs an application program using the extended peripheral set (630). The extended peripheral set includes at least some of the peripherals supplied by the NWP 105. For example, if the NWP 105 supplies a full-sized display monitor, keyboard and mouse, the user can work on a desktop application using the new peripheral set. The desktop application may reside inside of the mobile unit 125 and may represent a program such as a Microsoft Excel™ spreadsheet. Likewise, the application may run on a remote server such as the ASP server 135. In such a case, the ASP server practices a method such as the method 700 described below.

Because the OS in the mobile unit has been modified to include the extended peripheral set as supplied by the NWP 105, the application program's I/O is redirected to the extended peripheral set. If the application is local, the application is preferably sent a message from the OS to let it know that the augmented peripheral set is being used. This is necessary in many embodiments because the application program needs to customize the user interface differently for a small display. When a full sized display is in tact, the application supplies a UI customized to a full-sized display. In such embodiments, the OS preferably sends a message, interrupt or signal to the application to allow the application to alter its user interface. When the application runs remotely on the ASP server 135, a peripheral-set reconfiguration message is sent to the ASP server 135. In a preferred embodiment, the mobile unit invokes methods on one or more stub objects using overloaded method invocations so that processing with an extended set of peripherals is largely transparent to the software in the mobile unit 125.

In order to support security, it should be noted that the mobile unit 125 can interact with the ASP server 135 (or some other network server) in a variety of ways while the mobile unit is augmented with the peripheral services of the NWP 105. The mobile unit 125 and the ASP server 135 preferably establish an end-to-end secure connection. For example, the end-to-end session can be set up using secure socket layer (SSL) security, or IPSEC security, as long as the appropriate layer where encryption is applied is implemented on the mobile unit. End-to-end secure sessions allow the mobile unit to communicate with the ASP server 135 without being intercepted, even by the NWP 105. The mobile unit maintains security parameters such as encryption keys of a security association and performs cipher-processing to encrypt, decrypt, add digital signatures, and/or perform authentication processing. When the mobile unit implements the cipher processing, the security is end-to-end. In some cases asymmetric ciphers are used whereby the server 135 implements a portion of the cipher that requires significantly more resources than the portion implemented by the mobile unit 125. In one embodiment, the mobile unit 125 and the ASP server 135 communicate in a client-server session via the WAN using the wWAN transceiver 310. In another type of embodiment, the WAN communication is routed via the wLAN transceiver 305 to the NWP 105, and the NWP 105 provides a WAN gateway service. In either case, the communication between the mobile unit 125 and the server 135 are protected from snooping in the WAN 115 and/or the NWP 105.

In a security-related aspect of the present invention, 630 also involves sending a secure information record 355 to the server (e.g., ASP server 135). The secure information record 355 is used to allow the user to transmit sensitive information to the server without the need for the user to type the sensitive information into a keyboard. For example, if the server 135 needs sensitive information from the user, the user can click on an icon on the non-area-constrained user interface to cause the sensitive information to be sent. The user therefore does not need to enter the sensitive information into the keyboard of the NWP.

In another security-related aspect of the present invention, the mobile unit 125 uses a display projector to project a display image that supports the non-area constrained UI. For example, the NWP 105 provides a keyboard, a mouse, a power connector, and an Internet gateway service. The user then can use a non-area-constrained user interface without the need to supply potentially sensitive information to the frame buffer in the NWP. This is a stronger form of security than the distributed-object based methods because the NWP 105 never gets access to the frame buffer in any form. This method is preferably also used with the secure information records 355. In this combination, the NWP never has access to information displayed to the user (e.g., sensitive email messages) and never has access to sensitive input information (e.g., bank account numbers, pin codes, passwords).

In still another secure embodiment, the NWP 105 provides a power connector, a projection-display surface, a light-protection viewing area to protect the projection display surface from ambient light, and a WAN gateway. The NWP 105 may also supply a mouse device in such embodiments. The mouse device may be a Bluetooth™ device that wirelessly connects to the mobile unit 125, or a mouse device on the mobile unit 125 may be used. In this embodiment the user supplies his or her own lightweight and possibly folding keyboard. The NWP 105 supplies a support surface for the keyboard. Preferably, a projection device such as an RGB laser projection device as previously described is built directly into the lightweight and folding keyboard. Now the user can enter data into a keyboard and interact with a non-area-constrained UI without the NWP having access to input data or output data, except possibly mouse movements and clicks. All communication between the smart-phone base unit and the keyboard/projector of the mobile unit 125 are protected using a secure connection such an encrypted Bluetooth™ connection.

As previously discussed, the projector may be implemented as separate ultra-small device with its own Bluetooth link. In such a case the NWP 105 supplies a first platform where the user places the keyboard and another where the user places the projector. In all such embodiments, the projector can be implemented using LCD optical projections or scanning laser projections. In a preferred embodiment, a scanning RGB laser projector that either draws the UI or raster scans the UI is used.

In one type of embodiment of a laser UI projector designed in accordance with the present invention, multiple lasers are used to draw or scan sub-images to minimize flicker in the UI. When more than one laser is used, each sub-image is smaller, and can therefore be retraced more quickly for a given drawing or raster scanning rate. In addition to supplying one laser for each sub-image, a set of RGB lasers can be supplied for each sub-image. For example, a UI display area can be split into four sub-images and a set of RGB lasers can be used for each sub-image, for a total of twelve lasers in the projector.

While this solution is power consuming, the full desktop system is generally not needed all of the time. When the user uses the mobile unit 125 for telephony and mobile Internet applications, the full desktop UI is not needed. When the user is near a suitable projection-display surface, a power connector will often be available, possibly from an NWP.

It should be noted that NWP systems may be used in specific types of user environments. For example, in accordance with an aspect of the present invention NWP peripheral augmentation services are supplied in an aircraft. In this example, a user sits in a seat on an airliner. The user places a small keyboard on the fold-down table and behind the fold-down table is a display surface. In some embodiments the keyboard can be built into the fold-down table with a sliding piece of glass or plastic to cover it when not being used. The display surface is preferably adjustable to accommodate the chair in front being reclined by some angle. The display surface is adjusted to maintain a normal angle that is substantially aligned with the sight of the user (to within some tolerable error). In one type of embodiment, on the arms of the seat in the aircraft is a set of one or more lasers. These lasers project the UI image onto the display surface as previously discussed. The laser(s) may also be placed in other locations such as on the ceiling of the aircraft above the user. In another type of embodiment, the display surface behind the folding tray table provides an LCD monitor so no laser projectors are needed. Alternatively an LCD image may be projected onto the display area to minimize the hardware in the seat while giving the user an LCD-style user interface. All components are preferably linked together via Bluetooth™ or similar wireless local area networking technology. In all of the aforementioned embodiments, the display surface may optionally include touch-screen-input capability. The system operates as the NWP 105, possibly with no charge to the user since the user already paid for an airplane ticket. This type of embodiment shows an example of how the NWP 105 can be customized to a particular type of user environment. Any of the methods or systems disclosed herein can be used in such environments and customized therefore.

Referring now to FIG. 7, an embodiment of a method 700 practiced by the ASP server 135 is illustrated in flow chart form. A peripheral configuration of a mobile unit 125 is identified (705). The peripheral configuration may be identified specifically, or the manufacture and model number of the mobile unit 125 may be supplied to identify the peripheral configuration. If the mobile unit initiates a session with the ASP server 135 while already connected to the NWP 105, then the initial peripheral configuration is delivered to reflect the current set of available peripherals. An ASP client-server session is next established with the mobile unit 125 (710). This session preferably is secured via IPSEC, VPN, SSL and/or other network security technologies. The ASP server 135 next sends to the mobile unit 125 content that is customized to run on the mobile unit given its present peripheral configuration (715).

Next a peripheral reconfiguration message is received at the ASP server 135 via the WAN 115 (720). This message is received when the mobile unit 125 executes the step 625 and sends a peripheral reconfiguration message. For example, if the mobile unit connects or disconnects with an NWP 105 that supplies peripheral augmentation services, a peripheral reconfiguration message will be sent to the ASP server 135.

Next the ASP server updates a variable that defines the peripheral configuration of the mobile unit 125 (725). This reconfiguration reflects the mobile unit 125's current set of peripherals. The ASP server 135 next supplies content customized for the reconfigured set of peripherals of the mobile unit 125 (730). This content is customized for a different set of peripherals than the content that was delivered at step 715.

Optionally, a customer is billed for the use of ASP services (735). The customers may represent individual users, or may involve enterprise customers. Enterprise customers may pay a subscription fee for ASP services or may pay a licensing fee for incorporating the ASP server 135 as a portal to the computer system 145. Any of the previously discussed billing strategies (digital debit, credit card transactions, . . . ) can be used with the ASP server 135, but customers preferably use a subscription account (e.g., with fixed monthly fees and/usage-dependent fees) to access the ASP server 135. In some business methods, customers received ASP services for free and revenue is collected by other means such as banner advertising or other forms of Internet advertising.

In a specific type of embodiment, ASP server 135 is configured to supply global desktop services to allow users to access a set of applications and file system directories as would be available from a home/office computer desktop UI. As discussed previously, the ASP server can be implemented as a portal to the computer system 145. The portal may be installed directly into the computer system 145 or can be supplied remotely using TCP/IP and VPN tunneling techniques.

The method 700 also defines a business method. An ASP-business involves supplying one or more ASP servers 135 as illustrated in FIG. 1. In a preferred embodiment of the business method 700 the business supplies the ASP server 135. The ASP server 135 supplies a service such as the global desktop UI as discussed above. As per step 715, the ASP server 135 provides a representation of the desktop UI customized for use with the mobile unit 125. As per the step 720, the ASP server 135 accepts a parameter representative of the existence a modified set of peripheral devices available to the mobile unit 125 due to the contracting of a set of negotiated wireless peripheral services. As per step 730, the ASP server provides a second representation of the desktop UI for use with the modified set of peripherals.

As per 735, the business method also involves maintaining a customer base of users for global desktop services and charging users monthly and/or usage dependent fees for using the global desktop services. These fees are charged to supply users with access to desktop applications to include email, spreadsheets, and/or other applications available on their home or office systems. For example a user in the field may wish to connect up with an NWP to access a full-sized desktop UI and use the global desktop service to launch a web browser. Once using the web browser, the user may wish to access his or her own personal set of bookmarks. In embodiments where the end customer is an enterprise and the ASP server 135 is a portal running on the computer system 145, the business method involves collecting a licensing fee to allow the ASP server software to supply services from the home/office computer 145.

The method 700 can be modified to provide a product or service other than a peripheral augmentation service. As previously discussed, the set of NWP devices can in general be vending machines that vend products and/or services. The NWP's can also be configured as physical access control devices for vents such as movies, concerts, or sporting events. In such cases, the ASP server 135 serves as a merchant web site that vends products and/or services. The NWP devices serve as point of presence outlets for the ASP server 135 that is configured as a vending server 135. In this method, 715 is modified to send a message to instruct an NWP to provide a product or service. Steps 720, 725, and 730 are omitted and a fee is collected as per 735.

Referring now to FIG. 8, an embodiment of a method 800 for selling federated-negotiated wireless peripheral services with the assistance of associates is provided. The federated-negotiated wireless peripheral services are accessible to users of a system that provides application services to allow users to access server-side services using extended peripheral configurations and/or other products and/or services supplied by a federation of NWP's. See also the parent applications and note the methods taught therein involving associates can be augmented with the NWP's of the present invention.

The method involves enrolling associates using an on-line registration system (805). Each the associate supplies one or more NWP's into a network of NWP's. Each associate also indicates one or more services provided by the NWP device supplied by the associate. In some instances the associate may purchase an NWP device and the NWP device itself may provide an electronic indication of the peripheral services supplied by the device. In some cases the associate and/or the NWP device may simply supply a manufacturer and model number of the NWP system and the server may derive the set of services supplied by the NWP device from this information.

The method 800 also involves establishing a network session with the negotiated wireless peripheral device (810). The network session is established between the NWP management server 140 and the NWP 105. In preferred embodiments, a VPN technology is used to allow the NWP management server 140 to securely communicate with its associated NWP devices.

The method also involves receiving via the session an indication of a request by the mobile unit 125 for use of a service provided by the NWP 105 (815). As discussed previously, a position-dependent ecommerce session is established between the mobile unit 125 and the NWP 105. This session is preferably secured using authentication and encryption techniques as supplied by IPSEC and/or related VPN technologies. A billing arrangement is negotiated with the mobile unit 125 to contract with the NWP 105 (820). As discussed previously, the billing arrangement may involve digital debit, a credit card transaction, a subscriber account, or a license or contract with an enterprise.

Once the user has been authenticated and the service billing terms have been verified, the associate's NWP device supplies peripheral services to the mobile unit 125 (825). An invoice is then optionally generated for the NWP services rendered (830). The customer is then optionally billed for the NWP services (835). This may involve a usage fee, a subscription fee, or an enterprise-wide licensee, for example.

The associate who supplied the NWP is paid for providing the NWP node used in the federation of NWP nodes. The fee paid to the associate can be usage based so that the busiest NWP nodes produce the most revenues to the associate, or the associate may be paid as flat fee such as a monthly fee for supplying the NWP node.

In an alternative embodiment of the method 800, a company installs its own base of NWP access points. In this version, 805 involves installing a plurality of geographically dispersed NWP devices. The modified method 800 can be implemented along with the federated version of the method 800 at the same time. In this case a company installs a base of NWP devices but allows associates to augment the installed base so that coverage may be deployed more quickly and into markets not supported by the company's installed based of NWP systems. In the modified method 800, when a user accesses an NWP installed by the company, the step of paying the associate is omitted and the company retains the usage/subscription fee. In systems where a federation of NWP's is used to augment an installed base of NWP's, the fee is paid only for the NWP access points supplied by associates. The method 800 and the modified method 800 constitute business methods.

The method 800 can be modified in yet another way. In either of the versions of the method 800, the step 825 can be modified to provide a product or service other than a peripheral augmentation service. As previously discussed, the set of NWP devices can in general be vending machines that vend products and/or services.

Although the present invention has been described with reference to specific embodiments, other embodiments may occur to those skilled in the art without deviating from the intended scope. For example the NWP 105 can serve to provide peripheral augmentations to the mobile unit 125, but, as discussed above, the NWP 105 can more generally act as a wirelessly controlled vending device for products and/or services. Also, while many of the embodiments discussed herein discuss an ASP server 135, it is understood that the functions of the ASP server 135 can be implemented as a portal to the home/office computer system 145. While apparatus is generally described using block diagrams, some of these block diagrams, taken with their associated textual descriptions define methods practiced by the apparatus. Also, the ASP server can provide other products and services beside global desktop services. While the mobile unit 125 is often described as being a smart phone, it can correspond to other types of devices such as wireless data-only devices. While position-dependent ecommerce sessions are described as being between the mobile unit 125 and the NWP 105, in some embodiments, the NWP management server 140 can be involved in the session as a proxy or can otherwise act on behalf of the NWP 105 in position-dependent ecommerce sessions. In the method 800, the order of various steps can be changed. In any of the method taught and/or claims herein, the order of the steps, substeps or actions may be altered wherever such a change does not render the method inoperable. Also, the security procedures and the projection-based displays can be integrated into any of the methods or systems taught herein. Similarly, the NWP may provide power to the mobile unit 125 to include any projection device controlled by the mobile unit 125 via a wireless power inductive coupling. Either a standard wired power connector or a wireless inductive power coupling may be used. Also, in an aircraft or other embodiment, the NWP may supply a receptacle to seat a projection device controlled by the mobile unit 125. For example a small Bluetooth projector peripheral could be placed in a receptacle and pointed at the display surface to provide additional security for the user or for other purposes. Using an aspect of the present invention, when a touch screen display surface is used, the touch screen can include a photo detector at one or more cross-hair points on the display surface and provide a feedback signal to the display unit to allow the lasers to be electronically aligned/calibrated to properly cover the display surface. Therefore, it is to be understood that the invention herein encompasses all such embodiments that do not depart from the spirit and scope of the invention as defined in the appended claims.

What is claimed is:

1. A method comprising:
with a computerized handheld device comprising an internal display surface, and a built-in miniature display projector:
producing one or more signals representing a first raster image;
displaying the first raster image on the internal display surface;

producing one or more signals representing a second raster image; and optically projecting the second raster image onto a display surface that is external to the computerized handheld device using the built-in miniature display projector, wherein the first raster image comprises an area constrained version of a user interface and the second raster image comprises a non-area constrained version of the user interface.

2. The method as set forth in claim 1, wherein the first raster image comprises at least one of: a graphical output from an application program, or at least one frame of a digital video moving picture sequence, and wherein the second raster image comprises at least one of: the graphical output from the application program, or the at least one frame of the digital video moving picture sequence.

3. The method as set forth in claim 1, wherein the built-in miniature display projector comprises a red light source, a green light source and a blue light source, and optically projecting the second raster image onto the display surface further comprises, with the miniature display projector, raster scanning the second raster image.

4. The method as set forth in claim 3, wherein the red light source comprises a red laser, the green light source comprises a green laser and the blue light source comprises a blue laser.

5. The method as set forth in claim 1, wherein the built-in miniature display projector comprises an LCD display projector.

6. The method as set forth in claim 1, wherein the user interface comprises a color graphical user interface comprising one or more selectable portions, and the computerized handheld device comprises an input pointing device for indicating selections of the selectable portions of the color graphical user interface while the color graphical user interface is projected as the second raster image onto the display surface that is external to the computerized handheld device, the method further comprising:
  with the computerized handheld device:
    receiving an indication of a user selection associated with at least one of the selectable portions using the input pointing device; and
    in response to the user selection, executing one or more computerized actions.

7. The method as set forth in claim 1, wherein the computerized handheld device comprises at least one transceiver for wirelessly communicating, the method further comprising:
  in response to an indication to place a voice telephony call initiating the voice telephony call to a remote telephony device.

8. A method comprising:
  with a computerized handheld device that comprises a built-in miniature display projector, an internal display device, and a storage medium configured to store digital content:
    generating one or more signals representing a raster image representation of at least a portion of the stored digital content to generate a non-area constrained version of a user interface that is displayable via the internal display as an area constrained version of the user interface;
    coupling the raster image representation to the built-in miniature display projector; and
    optically projecting the raster image representation onto a display surface external to the computerized handheld device to display a non-area constrained version of the user interface.

9. The method as set forth in claim 8, wherein the stored digital content comprises digital video moving picture content and the raster image representation comprises at least one frame of the digital video moving picture content.

10. The method as set forth in claim 8, wherein the raster image representation comprises a graphical output generated under the control of an application program.

11. The method as set forth in claim 8, wherein the user interface comprises a color graphical user interface comprising one or more selectable portions, and the computerized handheld device comprises an input pointing device for pointing at and selecting the selectable portions of the color graphical user interface, the method further comprising:
  with the computerized handheld device:
    while the color graphical user interface is projected as the raster image onto the display surface external to the computerized handheld device, receiving an indication of a user selection of at least one of the selectable portions using the input pointing device; and
    in response to the user selection, executing one or more computerized actions.

12. The method as set forth in claim 11, wherein the computerized handheld device comprises at least one wireless communications transceiver and is operable to place and receive voice telephony calls.

13. The method as set forth in claim 8, wherein the built-in miniature display projector comprises a red light source, a green light source and a blue light source, and the optically projecting the raster image representation further comprises, with the built-in miniature display projector, raster scanning the raster image representation.

14. A method comprising:
  with a wireless peripheral device that comprises an internal display device and a built-in miniature display projector, and wherein the wireless peripheral device is wirelessly coupled to a computerized device via a short range wireless air interface:
    wirelessly receiving, via the short range wireless air interface, one or more signals representing displayable content from the computerized device;
    coupling the displayable content to the built-in miniature display projector; and
    optically projecting an image comprising the displayable content onto a display surface external to the wireless peripheral device, wherein the image further comprises a non-area constrained version of a user interface that is also displayable via the internal display as an area constrained version of the user interface.

15. The method as set forth in claim 14, wherein the computerized device comprises a wireless handheld device.

16. The method as set forth in claim 14, wherein the wireless peripheral device further comprises a keyboard, the method further comprising:
  with the wireless peripheral device:
    receiving a user keystroke input via the keyboard; and
    transmitting information related to the keystroke input to the computerized device via the short range wireless air interface.

17. The method as set forth in claim 14, wherein the wirelessly receiving is performed in accordance with a Bluetooth communication protocol.

18. A method comprising:
  with a wireless peripheral device comprising a built-in display projector and an internal display device:

receiving, via a wireless coupling from an external user-operated device, one or more signals representing displayable content to be displayed;

rasterizing the displayable content to produce one or more signals representing an image of the displayable content, wherein the image further comprises a non-area constrained version of a user interface that is also displayable via the internal display as an area constrained version of the user interface;

coupling the one or more signals representing the image of the displayable content to the built-in display projector; and optically projecting the image of the displayable content onto a viewing surface external to the wireless peripheral device using the built-in display projector;

wherein the built-in display projector raster scans the image of the displayable content and comprises at least one of: an LCD display projector or a projector which comprises a red light source, a green light source and a blue light source.

19. The method as set forth in claim 18, wherein the red light source comprises a red laser, the green light source comprises a green laser and the blue light source comprises a blue laser.

20. The method as set forth in claim 18, wherein the receiving via the wireless coupling is performed in accordance with a Bluetooth communication protocol.

21. The method as set forth in claim 18, wherein the wireless peripheral device further comprises a keyboard, the method further comprising:

with the wireless peripheral device:
receiving a user keystroke input via the keyboard; and
transmitting information related to the keystroke input to the external user-operated device using a Bluetooth communication protocol.

22. A method comprising:

with a wireless handheld telephony device that comprises a built-in display projector, an internal display device, and a transceiver to place and receive telephone calls:
coupling one or more signals representing displayable content to the built-in display projector; and
optically projecting an image of the displayable content onto an external viewing surface using the built-in display projector, wherein the image further comprises a non-area constrained version of a user interface that is also displayable via the internal display as an area constrained version of the user interface.

* * * * *